United States Patent
Choi et al.

(10) Patent No.: US 12,452,454 B2
(45) Date of Patent: Oct. 21, 2025

(54) ENTROPY CODING METHOD AND DEVICE IN VIDEO/IMAGE CODING SYSTEM

(71) Applicant: LG ELECTRONICS INC., Yeongdeungpo-gu Seoul (KR)

(72) Inventors: Jungah Choi, Seoul (KR); Jin Heo, Seoul (KR); Sunmi Yoo, Seoul (KR); Jaehyun Lim, Seoul (KR); Jangwon Choi, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 17/767,388

(22) PCT Filed: Oct. 6, 2020

(86) PCT No.: PCT/KR2020/013528
§ 371 (c)(1),
(2) Date: Apr. 7, 2022

(87) PCT Pub. No.: WO2021/071188
PCT Pub. Date: Apr. 15, 2021

(65) Prior Publication Data
US 2024/0080480 A1 Mar. 7, 2024

Related U.S. Application Data

(60) Provisional application No. 62/911,978, filed on Oct. 7, 2019.

(51) Int. Cl.
*H04N 19/18* (2014.01)
*H04N 19/176* (2014.01)
(Continued)

(52) U.S. Cl.
CPC ........... *H04N 19/60* (2014.11); *H04N 19/176* (2014.11); *H04N 19/18* (2014.11); *H04N 19/70* (2014.11); *H04N 19/91* (2014.11)

(58) Field of Classification Search
CPC ...... H04N 19/60; H04N 19/176; H04N 19/18; H04N 19/70; H04N 19/91
(Continued)

(56) References Cited

U.S. PATENT DOCUMENTS

| | | |
|---|---|---|
| 2013/0114693 A1 | 5/2013 | Gao |
| 2015/0049819 A1* | 2/2015 | Lee ........................ H04N 19/91 375/240.23 |

(Continued)

FOREIGN PATENT DOCUMENTS

| | | |
|---|---|---|
| KR | 1020150139888 A | 12/2015 |
| KR | 1020160133509 A | 11/2016 |

(Continued)

*Primary Examiner* — Albert Kir
(74) *Attorney, Agent, or Firm* — Bryan Cave Leighton Paisner LLP

(57) ABSTRACT

A method by which a decoding device decodes a video, according to the present document, can comprise the steps of: acquiring, from a bitstream, information that indicates the level value of a transform coefficient in a current block; deriving, on the basis of whether the number of context coded bins maximally usable for the transform coefficient is greater than or equal to a threshold value, a rice parameter for the information that indicates the level value of the transform coefficient; deriving, on the basis of the rice parameter, a bin string for the information that indicates the level value of the transform coefficient; and deriving the level value of the transform coefficient on the basis of the bin string.

12 Claims, 14 Drawing Sheets

(51) Int. Cl.
*H04N 19/60* (2014.01)
*H04N 19/70* (2014.01)
*H04N 19/91* (2014.01)

(58) Field of Classification Search
USPC .................................................... 375/240.18
See application file for complete search history.

(56) References Cited

U.S. PATENT DOCUMENTS

| | | | | |
|---|---|---|---|---|
| 2015/0110198 | A1* | 4/2015 | Kim | H03M 7/4018 |
| | | | | 375/240.18 |
| 2020/0077117 | A1* | 3/2020 | Karczewicz | H04N 19/13 |
| 2020/0186814 | A1* | 6/2020 | Karczewicz | H04N 19/176 |
| 2021/0092414 | A1* | 3/2021 | Karczewicz | H04N 19/18 |
| 2021/0195197 | A1* | 6/2021 | Kato | H04N 19/176 |
| 2021/0368176 | A1* | 11/2021 | Bross | H04N 19/132 |
| 2022/0201332 | A1* | 6/2022 | Rusanovskyy | H04N 19/176 |
| 2023/0097659 | A1* | 3/2023 | Choi | H04N 19/60 |
| | | | | 375/240.18 |
| 2023/0118451 | A1* | 4/2023 | Choi | H04N 19/70 |
| | | | | 375/240.02 |
| 2023/0291906 | A1* | 9/2023 | Jhu | H04N 19/46 |

FOREIGN PATENT DOCUMENTS

| | | |
|---|---|---|
| KR | 1020180006495 A | 1/2018 |
| KR | 1020190021501 A | 3/2019 |

* cited by examiner

: Target transform coefficient

: Neighboring transform coefficient

: Target transform coefficient

: Neighboring transform coefficient

ENTROPY CODING METHOD AND DEVICE IN VIDEO/IMAGE CODING SYSTEM

This application is a National Stage entry of International Application No. PCT/KR2020/013528 filed Oct. 6, 2020, which claims priority to U.S. Provisional Application No. 62/911,978 filed Oct. 7, 2019, both of which are incorporated by reference for all purposes as if fully set forth herein.

BACKGROUND

Technical Field

The present disclosure relates to a method and an apparatus for deriving a rice parameter used when binarizing the level value of a transform coefficient in entropy encoding/decoding of a video/image.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

A technical subject of the present document is to provide a method and an apparatus for enhancing a video/image coding efficiency.

Another technical subject of the present document is to provide a method and an apparatus for improving a residual coding efficiency.

Still another technical subject of the present document is to provide a method and an apparatus for reducing a memory size necessary for residual coding in various environments.

According to an embodiment of the present document, a video decoding method performed by a decoding apparatus may include: obtaining information indicating a level value of a transform coefficient in a current block from a bitstream; deriving a rice parameter for the information indicating the level value of the transform coefficient based on whether a maximum number of context coded bins available for the transform coefficient is larger than or equal to a threshold value; deriving a bin string for the information indicating the level value of the transform coefficient based on the rice parameter; and deriving the level value of the transform coefficient based on the bin string.

According to another embodiment of the present document, a video encoding method performed by an encoding apparatus may include: generating information indicating a level value of a transform coefficient in a current block; deriving a rice parameter for the information indicating the level value of the transform coefficient based on whether a maximum number of context coded bins available for the transform coefficient is larger than or equal to a threshold value; deriving a bin string for the information indicating the level value of the transform coefficient based on the rice parameter; and encoding the bin string.

According to still another embodiment of the present document, a computer-readable digital storage medium may include information to cause a decoding apparatus to perform a decoding method, and the decoding method may include: obtaining information indicating a level value of a transform coefficient in a current block from a bitstream; deriving a rice parameter for the information indicating the level value of the transform coefficient based on whether a maximum number of context coded bins available for the transform coefficient is larger than or equal to a threshold value; deriving a bin string for the information indicating the level value of the transform coefficient based on the rice parameter; and deriving the level value of the transform coefficient based on the bin string.

According to an embodiment of the present document, overall video/image compression efficiency may be improved.

According to an embodiment of the present document, the efficiency of residual coding may be improved as the complexity of residual coding is reduced.

According to an embodiment of the present document, a memory size required for residual coding in various environments may be reduced without an additional look-up table or signaling.

DESCRIPTION OF EXEMPLARY EMBODIMENTS

Figure 1:
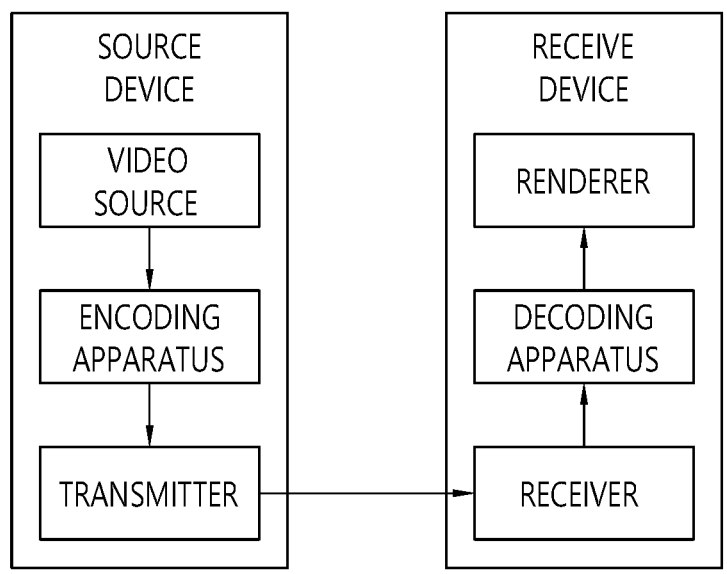
FIG. 1 schematically illustrates an example of a video/image coding system to which embodiments of the present document are applicable.

The disclosure of the present document may be modified in various forms, and specific embodiments thereof will be described and illustrated in the drawings. The terms used in the present document are used to merely describe specific embodiments, but are not intended to limit the disclosed method in the present document. An expression of a singular number includes an expression of 'at least one', so long as it is clearly read differently. The terms such as "include" and "have" are intended to indicate that features, numbers, steps, operations, elements, components, or combinations thereof used in the document exist and it should be thus understood that the possibility of existence or addition of one or more different features, numbers, steps, operations, elements, components, or combinations thereof is not excluded.

In addition, each configuration of the drawings described in the present document is an independent illustration for explaining functions as features that are different from each other, and does not mean that each configuration is implemented by mutually different hardware or different software. For example, two or more of the configurations may be combined to form one configuration, and one configuration may also be divided into multiple configurations. Without departing from the gist of the disclosed method of the present document, embodiments in which configurations are combined and/or separated are included in the scope of the disclosure of the present document.

Hereinafter, embodiments of the present document will be described in detail with reference to the accompanying drawings. In addition, like reference numerals are used to indicate like elements throughout the drawings, and the same descriptions on the like elements may be omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, a method/embodiment disclosed in the present document may be applied to a method disclosed in a versatile video coding (VVC) standard. In addition, the method/embodiment disclosed in the present document may be applied to a method disclosed in an essential video coding (EVC) standard, AOMedia Video 1 (AV1) standard, 2nd generation of audio video coding standard (AVS2), or a next-generation video/image coding standard (e.g., H.267, H.268, etc.).

Various embodiments related to video/image coding are presented in the present document, and the embodiments may be combined with each other unless otherwise stated.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture). A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture). A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In the present document, tile group and slice may be used interchangeably. For example, in the present document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. Cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In the present document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present document should be interpreted to indicate "additionally or alternatively."

Further, the parentheses used in the present document may mean "for example". Specifically, in case that "prediction (intra prediction)" is expressed, it may be indicated that "intra prediction" is proposed as an example of "prediction". In other words, the term "prediction" in the present document is not limited to "intra prediction", and "intra prediction" is proposed as an example of "prediction". Further, even in case that "prediction (i.e., intra prediction)" is expressed, it may be indicated that "intra prediction" is proposed as an example of "prediction".

In the present document, technical features individually explained in one drawing may be individually implemented or simultaneously implemented.

Figure 2:
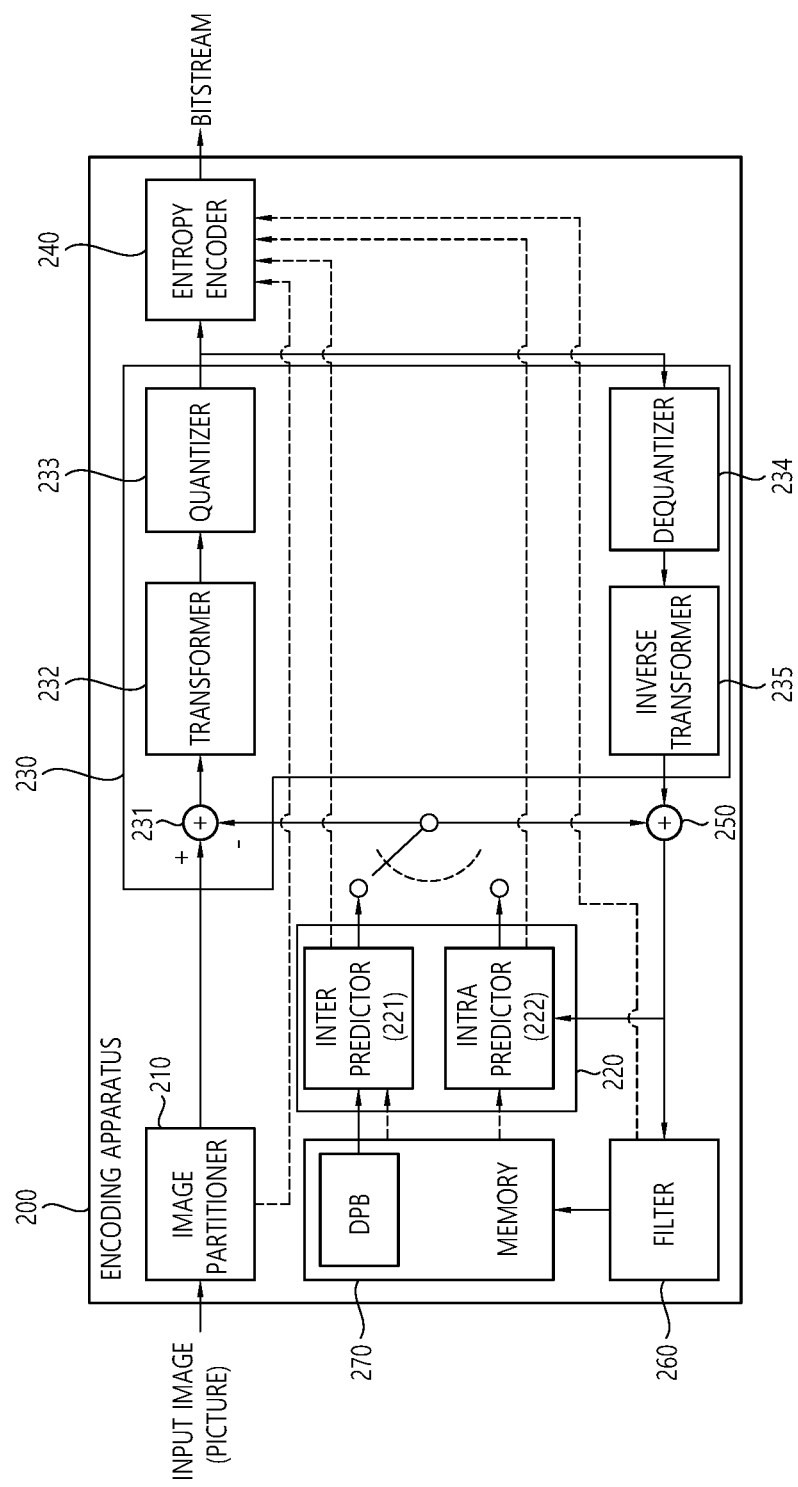
FIG. 2 is a diagram schematically illustrating a configuration of a video/image encoding apparatus to which the embodiments of the present document are applicable.

FIG. 2 is a diagram schematically illustrating the configuration of a video/image encoding apparatus to which the embodiments of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may subtract the prediction signal (predicted block, prediction sample array) output from the inter predictor 221 or the intra predictor 222 from the input image signal (original block, original sample array) to generate a residual signal (residual block, residual sample array), and the generated residual signal is transmitted to the transformer 232. In this case, as illustrated, a unit for subtracting the prediction signal (prediction block, prediction sample array) from an input image signal (original block, original sample array) in the encoder 200 may be referred to as a subtractor 231. The predictor 220 may perform prediction on a processing target block (hereinafter, referred to as a current block) and generate a predicted block including prediction samples for the current block. The predictor 220 may determine whether intra prediction or inter prediction is applied in units of a current block or CU. The predictor 220 may generate various kinds of information on prediction, such as prediction mode information, and transmit the generated information to the entropy encoder 240, as is described below in the description of each prediction mode. The information on prediction may be encoded by the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods to be described below. For example, the predictor 220 may apply intra prediction or inter prediction for prediction of one block and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC basically performs prediction within the current picture, but may be performed similarly to inter prediction in that a reference block is derived within the current picture. That is, IBC may use at least one of the inter prediction techniques described in the present document. The palette mode may be viewed as an example of intra coding or intra prediction. When the palette mode is applied, a sample value in the picture may be signaled based on information on the palette table and the palette index.

The prediction signal generated by the predictor (including the inter predictor 221 and/or the intra predictor 222) may be used to generate a reconstructed signal or may be used to generate a residual signal.

The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, GBT refers to transformation obtained from a graph when expressing relationship information between pixels in the graph. CNT refers to transformation obtained based on a prediction signal generated using all previously reconstructed pixels. Also, the transformation process may be applied to a block of pixels having the same size as a square or may be applied to a block of a variable size that is not a square.

The quantizer 233 quantizes the transform coefficients and transmits the same to the entropy encoder 240, and the entropy encoder 240 encodes the quantized signal (information on the quantized transform coefficients) and outputs the encoded signal as a bitstream. Information on the quantized transform coefficients may be referred to as residual information. The quantizer 233 may rearrange the quantized transform coefficients in the block form into a one-dimensional vector form based on a coefficient scan order and may generate information on the transform coefficients based on the quantized transform coefficients in the one-dimensional vector form.

The entropy encoder 240 may perform various encoding methods such as, for example, exponential Golomb, context-adaptive variable length coding (CAVLC), and context-adaptive binary arithmetic coding (CABAC). The entropy encoder 240 may encode information necessary for video/image reconstruction (e.g., values of syntax elements, etc.) other than the quantized transform coefficients together or separately. Encoded information (e.g., encoded video/image information) may be transmitted or stored in units of a network abstraction layer (NAL) unit in the form of a bitstream. The video/image information may further include information on various parameter sets, such as an adaptation parameter set (APS), a picture parameter set (PPS), a sequence parameter set (SPS), or a video parameter set (VPS). Also, the video/image information may further include general constraint information. In the present document, information and/or syntax elements transmitted/signaled from the encoding apparatus to the decoding apparatus may be included in video/image information. The video/image information may be encoded through the encoding procedure described above and included in the bitstream. The bitstream may be transmitted through a network or may be stored in a digital storage medium. Here, the network may include a broadcasting network and/or a communication network, and the digital storage medium may include various storage media such as USB, SD, CD, DVD, Blu-ray, HDD, and SSD. A transmitting unit (not shown) and/or a storing unit (not shown) for transmitting or storing a signal output from the entropy encoder 240 may be configured as internal/external elements of the encoding apparatus 200, or the transmitting unit may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transform unit 235. The adder 250 may add the reconstructed residual signal to the prediction signal output from the inter predictor 221 or the intra predictor 222 to generate a reconstructed signal (reconstructed picture, reconstructed block, reconstructed sample array). When there is no residual for the processing target block, such as when the skip mode is applied, the predicted block may be used as a reconstructed block. The adder 250 may be referred to as a restoration unit or a restoration block generator. The generated reconstructed signal may be used for intra prediction of a next processing target block in the current picture, or may be used for inter prediction of the next picture after being filtered as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
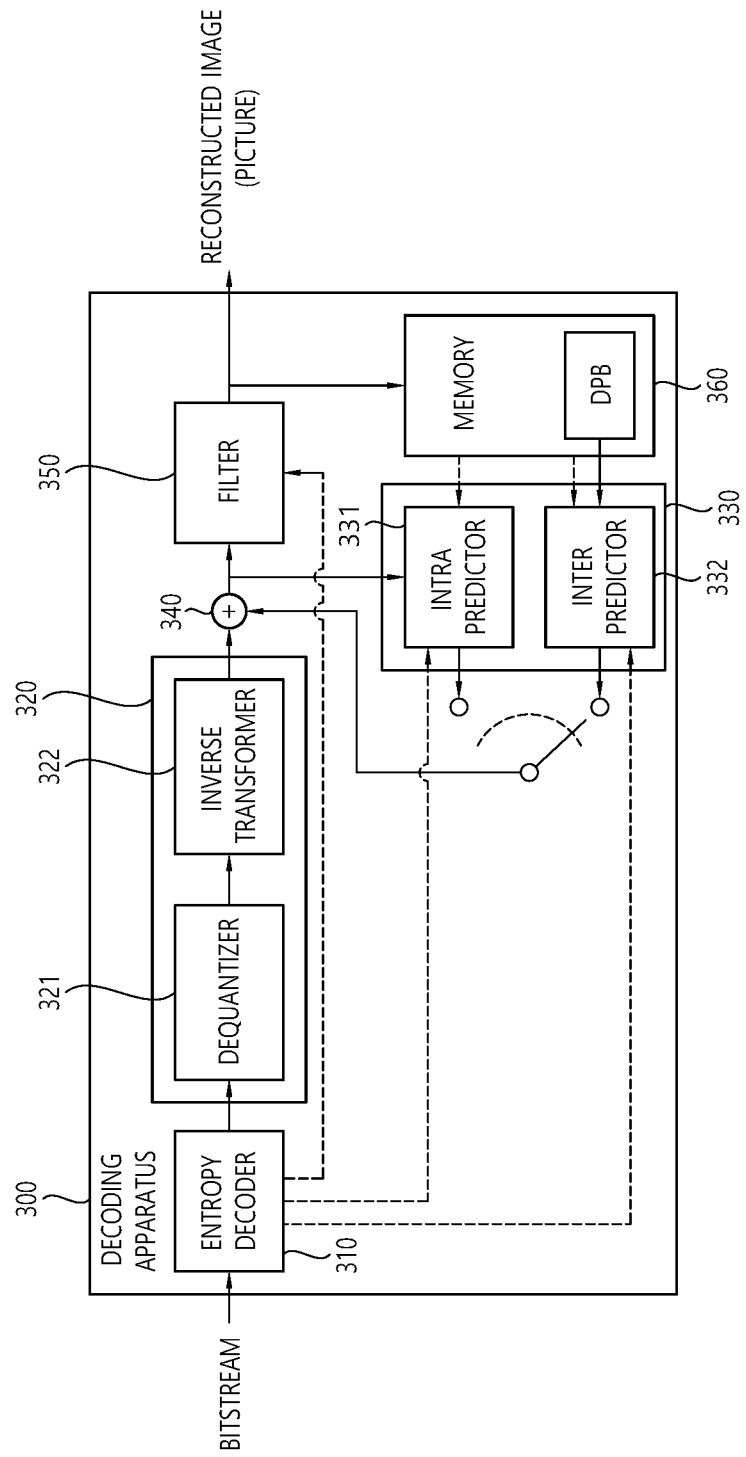
FIG. 3 is a diagram schematically illustrating a configuration of a video/image decoding apparatus to which the embodiments of the present document are applicable.

FIG. 3 is a diagram for schematically explaining the configuration of a video/image decoding apparatus to which the embodiments of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, context-adaptive variable length coding (CAVLC), or context-adaptive arithmetic coding (CABAC), and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (inter predictor 332 and intra predictor 331), and residual values on which the entropy decoding has been performed in the entropy decoder 310, that is, the quantized transform coefficients and related parameter information, may be input to the residual processor 320.

The residual processor 320 may derive a residual signal (residual block, residual samples, or residual sample array). Also, information on filtering among the information decoded by the entropy decoder 310 may be provided to the filter 350. Meanwhile, a receiving unit (not shown) for receiving a signal output from the encoding apparatus may be further configured as an internal/external element of the decoding apparatus 300, or the receiving unit may be a component of the entropy decoder 310. Meanwhile, the decoding apparatus according to the present document may be called a video/image/picture decoding apparatus, and the decoding apparatus may be divided into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, an inter predictor 332, and an intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information on prediction output from the entropy decoder 310, and determine a specific intra/inter prediction mode.

The predictor 330 may generate a prediction signal based on various prediction methods to be described later. For example, the predictor may apply intra prediction or inter prediction for prediction of one block, and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC may basically perform prediction within the current picture, but may be performed similarly to inter prediction in that a reference block is derived within the current picture. That is, IBC may use at least one of the inter prediction techniques described in the present document. The palette mode may be considered as an example of intra coding or intra prediction. When the palette mode is applied, information on the palette table and the palette index may be included in the video/image information and signaled.

The intra predictor 331 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor (including inter predictor 332 and/or intra predictor 331). If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In the present document, the embodiments described in the filter 260, the inter predictor 221, and the intra predictor 222 of the encoding apparatus 200 may be applied equally or to correspond to the filter 350, the inter predictor 332, and the intra predictor 331.

The video/image coding method according to the present document may be performed based on the following partitioning structure. Specifically, procedures of prediction, residual processing ((inverse) transform and (de)quantization), syntax element coding, and filtering to be described later may be performed based on CTU and CU (and/or TU and PU) derived based on the partitioning structure. A block partitioning procedure may be performed by the image partitioner 210 of the above-described encoding apparatus, and partitioning-related information may be (encoding) processed by the entropy encoder 240, and may be transferred to the decoding apparatus in the form of a bitstream. The entropy decoder 310 of the decoding apparatus may derive the block partitioning structure of the current picture based on the partitioning-related information obtained from the bitstream, and based on this, may perform a series of procedures (e.g., prediction, residual processing, block/picture reconstruction, in-loop filtering, and the like) for image decoding. The CU size and the TU size may be equal to each other, or a plurality of TUs may be present within a CU region. Meanwhile, the CU size may generally represent a luma component (sample) coding block (CB) size. The TU size may generally represent a luma component (sample) transform block (TB) size. The chroma component (sample) CB or TB size may be derived based on the luma component (sample) CB or TB size in accordance with a component ratio according to a color format (chroma format, e.g., 4:4:4, 4:2:2, 4:2:0 and the like) of a picture/image. The TU size may be derived based on maxTbSize. For example, if the CU size is larger than the maxTb Size, a plurality of TUs (TBs) of the maxTb Size may be derived from the CU, and the transform/inverse transform may be performed in the unit of TU (TB). Further, for example, in case that intra prediction is applied, the intra prediction mode/type may be derived in the unit of CU (or CB), and neighboring reference sample derivation and prediction sample generation procedures may be performed in the unit of TU (or TB). In this case, one or a plurality of TUs (or TBs) may be present in one CU (or CB) region, and in this case, the plurality of TUs (or TBs) may share the same intra prediction mode/type.

Further, in the video/image coding according to the present document, an image processing unit may have a hierarchical structure. One picture may be partitioned into one or more tiles, bricks, slices, and/or tile groups. One slice may include one or more bricks. On brick may include one or more CTU rows within a tile. The slice may include an integer number of bricks of a picture. One tile group may include one or more tiles. One tile may include one or more CTUs. The CTU may be partitioned into one or more CUs. A tile represents a rectangular region of CTUs within a particular tile column and a particular tile row in a picture. A tile group may include an integer number of tiles according to a tile raster scan in the picture. A slice header may carry information/parameters that can be applied to the corresponding slice (blocks in the slice). In case that the encoding/decoding apparatus has a multi-core processor, encoding/decoding processes for the tiles, slices, bricks, and/or tile groups may be processed in parallel. In the present document, the slice or the tile group may be used exchangeably. That is, a tile group header may be called a slice header. Here, the slice may have one of slice types including intra (I) slice, predictive (P) slice, and bi-predictive (B) slice. In predicting blocks in I slice, inter prediction may not be used, and only intra prediction may be used. Of course, even in this case, signaling may be performed by coding the original sample value without prediction. With respect to blocks in P slice, intra prediction or inter prediction may be used, and in case of using the inter prediction, only uni-prediction can be used. Meanwhile, with respect to blocks in B slice, the intra prediction or inter prediction may be used, and in case of using the inter prediction, up to bi-prediction can be maximally used.

The encoder may determine the tile/tile group, brick, slice, and maximum and minimum coding unit sizes in consideration of the coding efficiency or parallel processing, or according to the characteristics (e.g., resolution) of a video image, and information for them or information capable of inducing them may be included in the bitstream.

The decoder may obtain information representing the tile/tile group, brick, and slice of the current picture, and whether the CTU in the tile has been partitioned into a plurality of coding units. By making such information be obtained (transmitted) only under a specific condition, the efficiency can be enhanced.

The slice header (slice header syntax) may include information/parameters that can be commonly applied to the slice. APS (APS syntax) or PPS (PPS syntax) may include information/parameters that can be commonly applied to one or more pictures. The SPS (SPS syntax) may include information/parameters that can be commonly applied to one or more sequences. The VPS (VPS syntax) may include information/parameters that can be commonly applied to multiple layers. The DPS (DPS syntax) may include information/parameters that can be commonly applied to overall video. The DPS may include information/parameters related to concatenation of a coded video sequence (CVS).

In the present document, an upper-level syntax may include at least one of the APS syntax, PPS syntax, SPS syntax, VPS syntax, DPS syntax, and slice header syntax.

Further, for example, information about partitioning and configuration of the tile/tile group/brick/slice may be configured by an encoding end through the upper-level syntax, and may be transferred to the decoding apparatus in the form of a bitstream.

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In the present document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of the present document as well.

As described above, the encoding apparatus may perform various encoding methods such as exponential Golomb, context-adaptive variable length coding (CAVLC), and context-adaptive binary arithmetic coding (CABAC). In addition, the decoding apparatus may decode information in a bitstream based on a coding method such as exponential Golomb coding, CAVLC or CABAC, and output a value of a syntax element required for image reconstruction and quantized values of transform coefficients related to residuals. For example, the coding methods described above may be performed as in the following contents.

Figure 4:
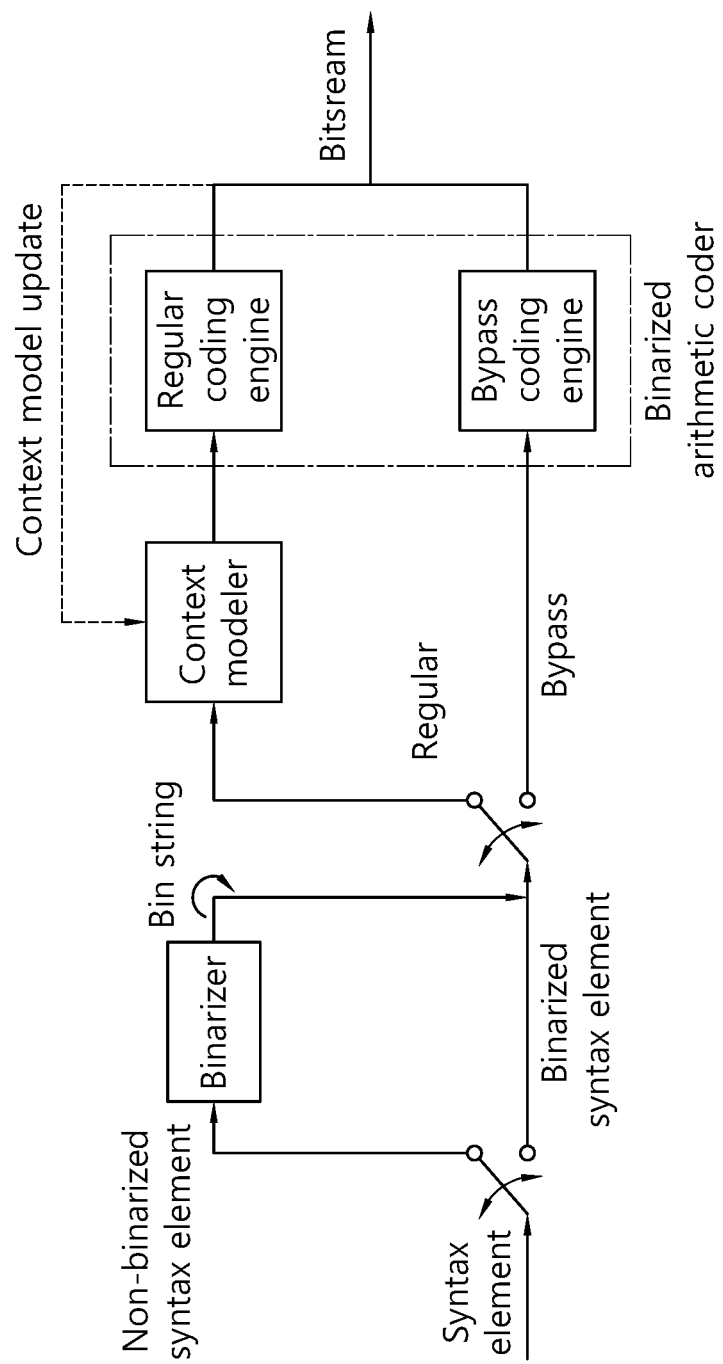
FIG. 4 exemplarily illustrates context-adaptive binary arithmetic coding (CABAC) for encoding a syntax element.

FIG. 4 exemplarily shows context-adaptive binary arithmetic coding (CABAC) for encoding a syntax element.

An encoding process of CABAC may include a process of transforming an input signal into a binary value through binarization in case that the input signal is not the binary value, but is a syntax element. If the input signal is already the binary value (i.e., if the value of the input signal is the binary value), the corresponding input signal may be bypassed without being binarized. Here, each binary number 0 or 1 constituting the binary value may be called a bin. For example, if a binary string after binarization is 110, each of 1, 1, and 0 is called one bin. The bin(s) for one syntax element may indicate a value of the syntax element.

The binarized bins of the syntax element may be input to a regular encoding engine or a bypass encoding engine. The regular encoding engine may allocate a context model that reflects a probability value to the corresponding bin, and may code the corresponding bin based on the allocated context model. The regular encoding engine may update the context model for the corresponding bin after performing the coding for the respective bins. The bin being coded as described above may be called a context-coded bin.

Meanwhile, in case that the binarized bins of the syntax element are input to the bypass encoding engine, they may be coded as follows. For example, the bypass encoding engine of the encoding apparatus omits a procedure of estimating probability for the input bin and a procedure of updating a probability model applied to the bin after encoding. In case that the bypass encoding is applied, the encoding apparatus may encode the input bin by applying a uniform probability distribution instead of allocating the context model, and through this, the encoding speed can be improved. The bin being encoded as described above may be called a bypass bin.

Entropy decoding performs the same process as the entropy encoding as described above in reverse order. For example, in case that the syntax element is decoded based on the context model, the decoding apparatus may receive the bin corresponding to the syntax element through a bitstream. Further, the decoding apparatus may determine the context model using the syntax element, decoding information of a decoding target block or a neighboring block, or information of a symbol/bin decoded in a previous step, and may derive the value of the syntax element by performing arithmetic decoding of the bin through prediction of the probability of occurrence of the received bin according to the determined context model. Thereafter, the context model of the bin being next decoded may be updated with the determined context model.

Further, for example, in case that the syntax element is bypass-decoded, the decoding apparatus may receive the bin corresponding to the syntax element through the bitstream, and may decode the input bin by applying the uniform probability distribution. In this case, the procedure of deriving the context model of the syntax element and the procedure of updating the context model applied to the bin after decoding may be omitted.

The residual samples may be derived as quantized transform coefficients through transform and quantization processes. The quantized transform coefficients may be called transform coefficients. In this case, the transform coefficients in the block may be signaled in the form of residual information. The residual information may include a residual coding syntax. That is, the encoding apparatus may configure and encode the residual coding syntax based on the residual information to output the residual coding syntax in the form of a bitstream, and the decoding apparatus may derive the residual (quantized) transform coefficients by decoding the residual coding syntax obtained from the bitstream. As described below, the residual coding syntax may include syntax elements representing whether transform has been applied to the corresponding block, where is the location of the last effective transform coefficient in the block, whether the effective transform coefficient is present in the subblock, and what is the size/sign of the effective transform coefficient.

For example, the (quantized) transform coefficient may be encoded and/or decoded based on the syntax elements, such as last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gtX_flag, abs_remainder, coeff_sign_flag, and dec_abs_level. This may be called residual (data) coding or (transform) coefficient coding. The syntax elements related to the encoding/decoding of the residual data may be represented as in Table 1 or Table 2 below.

TABLE 1

| | Descriptor |
|---|---|
| residual_coding( x0, y0, log2TbWidth, log2TbHeight, cIdx ) {    if( ( tu_mts_idx[ x0 ][ y0 ] > 0 \|\|      ( cu_sbt_flag && log2TbWidth < 6 && log2TbHeight < 6 ) )      && cIdx == 0 && log2TbWidth > 4 )     log2ZoTbWidth = 4    else     log2ZoTbWidth = Min( log2TbWidth, 5 )    MaxCcbs = 2 * ( 1 << log2TbWidth ) * ( 1<<log2TbHeight )    if( tu_mts_idx[ x0 ][ y0 ] > 0 \|\|      ( cu_sbt_flag && log2TbWidth < 6 && log2TbHeight < 6 ) )      && cIdx == 0 && log2TbHeight > 4 )     log2ZoTbHeight = 4    else | |

TABLE 1-continued

|  | Descriptor |
|---|---|
| ```
    log2ZoTbHeight = Min( log2TbHeight, 5 )
if( log2TbWidth > 0 )
    last_sig_coeff_x_prefix
if( log2TbHeight > 0 )
    last_sig_coeff_y_prefix
if( last_sig_coeff_x_prefix > 3 )
    last_sig_coeff_x_suffix
if( last_sig_coeff_y_prefix > 3 )
    last_sig_coeff_y_suffix
log2TbWidth = log2ZoTbWidth
log2TbHeight = log2ZoTbHeight
remBinsPass1 = ( ( 1 << ( log2TbWidth + log2TbHeight ) ) * 7 ) >> 2
log2SbW = ( Min( log2TbWidth, log2TbHeight ) < 2 ? 1 : 2 )
log2SbH = log2SbW
if( log2TbWidth + log2TbHeight > 3 ) {
    if( log2TbWidth < 2 ) {
        log2SbW = log2TbWidth
        log2SbH = 4 − log2SbW
    } else if( log2TbHeight < 2 ) {
        log2SbH = log2TbHeight
        log2SbW = 4 − log2SbH
    }
}
numSbCoeff = 1 << ( log2SbW + log2SbH )
lastScanPos = numSbCoeff
lastSubBlock = ( 1 << ( log2TbWidth + log2TbHeight − ( log2SbW + log2SbH ) ) ) − 1
do {
    if( lastScanPos == 0 ) {
        lastScanPos = numSbCoeff
        lastSubBlock−−
    }
    lastScanPos−−
    xS = DiagScanOrder[ log2TbWidth − log2SbW ][ log2TbHeight − log2SbH ]
                [ lastSubBlock ][ 0 ]
    yS = DiagScanOrder[ log2TbWidth − log2SbW ][ log2TbHeight − log2SbH ]
                [ lastSubBlock ][ 1 ]
    xC = ( xS << log2SbW ) + DiagScanOrder[ log2SbW ][ log2SbH ][ lastScanPos ][ 0 ]
    yC = ( yS << log2SbH ) + DiagScanOrder[ log2SbW ][ log2SbH ][ lastScanPos ][ 1 ]
} while( ( xC != LastSignificantCoeffX ) || (yC != LastSignificantCoeffY ) )
if( lastSubBlock == 0 && log2TbWidth >= 2 && log2TbHeight >= 2
&&
    !transform_skip_flag[ x0 ][ y0 ] && lastScanPos > 0 )
    LfnstDcOnly = 0
if( ( lastSubBlock > 0 && log2TbWidth >= 2 && log2TbHeight >= 2 ) ||
    ( lastScanPos > 7 && ( log2TbWidth == 2 || log2TbWidth == 3 ) &&
    log2TbWidth == log2TbHeight ) )
    LfnstZeroOutSigCoeffFlag = 0
QState = 0
for( i = lastSubBlock; i >= 0; i−− ) {
    startQStateSb = QState
    xS = DiagScanOrder[ log2TbWidth − log2SbW ][ log2TbHeight − log2SbH ]
                [ i ][ 0 ]
    yS = DiagScanOrder[ log2TbWidth − log2SbW ][ log2TbHeight − log2SbH ]
                [ i ][ 1 ]
    inferSbDcSigCoeffFlag = 0
    if( ( i < lastSubBlock ) && ( i > 0 ) ) {
        coded_sub_block_flag[ xS ][ yS ]
        inferSbDcSigCoeffFlag = 1
    }
    firstSigScanPosSb = numSbCoeff
    lastSigScanPosSb = −1
    firstPosMode0 = ( i == lastSubBlock ? lastScanPos : numSbCoeff − 1 )
    firstPosMode1 = −1
    for( n = firstPosMode0; n >= 0 && remBinsPass1 >= 4; n−− ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( coded_sub_block_flag[ xS ][ yS ] && ( n > 0 || !inferSbDcSigCoeffFlag )
&&
            ( xC != LastSignificantCoeffX || yC != Last SignificantCoeffY ) ) {
            sig_coeff_flag[ xC ][ yC ]
            remBinsPass1−−
            if( sig_coeff_flag[ xC ][ yC ] )
                inferSbDcSigCoeffFlag = 0
        }
        if( sig_coeff_flag[ xC ][ yC ] ) {
            abs_level_gtx_flag[ n ][ 0 ]
            remBinsPass1−−
            if( abs_level_gtx_flag[ n ][ 0 ] ) {
``` | ae(v)<br><br>ae(v)<br><br>ae(v)<br><br>ae(v)<br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br>ae(v)<br><br><br><br><br><br><br><br><br><br><br><br><br><br>ae(v)<br><br><br><br>ae(v) |

TABLE 1-continued

| | Descriptor |
|---|---|
|       par_level_flag[ n ] | ae(v) |
|       remBinsPass1-- | |
|       abs_level_gtx_flag[ n ][ 1 ] | ae(v) |
|       remBinsPass1-- | |

```
         }
         if( lastSigScanPosSb == −1 )
            lastSigScanPosSb = n
         firstSigScanPosSb = n
      }
      AbsLevelPass1[ xC ][ yC ] = sig_coeff_flag[ xC ][ yC ] + par_level_flag[ n ] +
                    abs_level_gtx_flag[ n ][ 0 ] + 2 * abs_level_gtx_flag[ n ][ 1 ]
      if( dep_quant_enabled_flag )
         QState = QStateTransTable[ QState ][ AbsLevelPass1[ xC ][ yC ] & 1 ]
      if( remBinsPass1 < 4 )
         firstPosMode1 = n − 1
   }
   for( n = numSbCoeff − 1; n >= firstPosMode1; n-- ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( abs_level_gtx_flag[ n ][ 1 ] )
         abs_remainder[ n ]                                                              ae(v)
      AbsLevel[ xC ][ yC ] = AbsLevelPass1[ xC ][ yC ] +2 * abs_remainder[ n ]
   }
   for( n = firstPosMode1; n >= 0; n-- ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      dec_abs_level[ n ]                                                                 ae(v)
      if(AbsLevel[ xC ][ yC ] > 0 )
         firstSigScanPosSb = n
      if( dep_quant_enabled_flag )
         QState = QStateTransTable[ QState ][ AbsLevel[ xC ][ yC ] & 1 ]
   }
   if( dep_quant_enabled_flag || !sign_data_hiding_enabled_flag )
      signHidden = 0
   else
      signHidden = ( lastSigScanPosSb − firstSigScanPosSb > 3 ? 1 : 0 )
   for( n = numSbCoeff − 1; n >= 0; n-- ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( ( AbsLevel[ xC ][ yC ] > 0 ) &&
         ( !signHidden || ( n != firstSigScanPosSb ) ) )
         coeff_sign_flag[ n ]                                                            ae(v)
   }
   if( dep_quant_enabled_flag ) {
      QState = startQStateSb
      for( n = numSbCoeff − 1; n >= 0; n-- ) {
         xC = ( xS << log2SbW ) + DiagScanOrder[ log2SbW ][ log2SbH ][ n ][ 0 ]
         yC = ( yS << log2SbH ) + DiagScanOrder[ log2SbW ][ log2SbH ][ n ][ 1 ]
         if( AbsLevel[ xC ][ yC ] > 0 )
            TransCoeffLevel[ x0 ][ y0 ][ cIdx ][ xC ][ yC ] =
               ( 2 * AbsLevel[ xC ][ yC ] − ( QState > 1 ? 1 : 0 ) ) *
               ( 1 − 2 * coeff_sign_flag[ n ] )
         QState = QStateTransTable[ QState ][ par_level_flag[ n ] ]
   } else {
      sumAbsLevel = 0
      for( n = numSbCoeff − 1; n >= 0; n-- ) {
         xC = ( xS << log2SbW ) + DiagScanOrder[ log2SbW ][ log2SbH ][ n ][ 0 ]
         yC = ( yS << log2SbH ) + DiagScanOrder[ log2SbW ][ log2SbH ][ n ][ 1 ]
         if( AbsLevel[ xC ][ yC ] > 0 ) {
            TransCoeffLevel[ x0 ][ y0 ][ cIdx ][ xC ][ yC ] =
               AbsLevel[ xC ][ yC ] * ( 1 − 2 * coeff_sign_flag[ n ] )
            if( signHidden ) {
               sumAbsLevel += AbsLevel[ xC ][ yC ]
               if( ( n == firstSigScanPosSb ) && ( sumAbsLevel % 2 ) == 1 ) )
                  TransCoeffLevel[ x0 ][ y0 ][ cIdx ][ xC ][ yC ] =
                     −TransCoeffLevel[ x0 ][ y0 ][ cIdx ][ xC ][ yC ]
            }
         }
      }
   }
  }
 }
}
```

TABLE 2

| | Descriptor |
|---|---|
| ```
residual_coding( x0, y0, log2TbWidth, log2TbHeight, cIdx ) {
  if( sps_mts_enabled_flag && cu_sbt_flag && cIdx == 0 &&
      log2TbWidth == 5 && log2TbHeight < 6 )
    log2ZoTbWidth = 4
  else
    log2ZoTbWidth = Min( log2TbWidth, 5 )
  if( sps_mts_enabled_flag && cu_sbt_flag && cIdx == 0 &&
      log2TbWidth < 6 && log2TbHeight == 5 )
    log2ZoTbHeight = 4
  else
    log2ZoTbHeight = Min( log2TbHeight, 5 )
  if( log2TbWidth > 0 )
    last_sig_coeff_x_prefix
  if( log2TbHeight > 0 )
    last_sig_coeff_y_prefix
  if( last_sig_coeff_x_prefix > 3 )
    last_sig_coeff_x_suffix
  if( last_sig_coeff_y_prefix > 3 )
    last_sig_coeff_y_suffix
  log2TbWidth = log2ZoTbWidth
  log2TbHeight = log2ZoTbHeight
  remBinsPass1 = ( ( 1 << ( log2TbWidth + log2TbHeight ) ) * 7 ) >> 2
  log2SbW = ( Min( log2TbWidth, log2TbHeight ) < 2 ? 1 : 2 )
  log2SbH = log2SbW
  if( log2TbWidth + log2TbHeight > 3 )
    if( log2TbWidth < 2 ) {
      log2SbW = log2TbWidth
      log2SbH = 4 - log2SbW
    } else if( log2TbHeight < 2 ) {
      log2SbH = log2TbHeight
      log2SbW = 4 - log2SbH
    }
  numSbCoeff = 1 << ( log2SbW + log2SbH )
  lastScanPos = numSbCoeff
  lastSubBlock = ( 1 << ( log2TbWidth + log2TbHeight - ( log2SbW + log2SbH ) ) ) - 1
  do {
    if( lastScanPos == 0 ) {
      lastScanPos = numSbCoeff
      lastSubBlock--
    }
    lastScanPos--
    xS = DiagScanOrder[ log2TbWidth - log2SbW ][ log2TbHeight = log2SbH ]
                     [ lastSubBlock ][ 0 ]
    yS = DiagScanOrder[ log2TbWidth - log2SbW ][ log2TbHeight - log2SbH ]
                     [ lastSubBlock ][ 1 ]
    xC = ( xS << log2SbW ) + DiagScanOrder[ log2SbW ][ log2SbH ][ lastScanPos ][ 0 ]
    yC = ( yS << log2SbH ) + DiagScanOrder[ log2SbW ][ log2SbH ][ lastScanPos ][ 1 ]
  } while( ( xC != LastSignificantCoeffX ) || ( yC != LastSignificantCoeffY ) )
  if( lastSubBlock == 0 && log2TbWidth >= 2 && log2TbHeight >= 2
&&
      !transform_skip_flag[ x0 ][ y0 ][ cIdx ] && lastScanPos > 0 )
    LfnstDcOnly = 0
  if( ( lastSubBlock > 0 && log2TbWidth >= 2 && log2TbHeight >= 2 ) ||
      ( lastScanPos > 7 && ( log2TbWidth == 2 || log2TbWidth == 3 ) )
&&
      log2TbWidth == log2TbHeight ) )
    LfnstZeroOutSigCoeffFlag = 0
  if( ( lastSubBlock > 0 || lastScanPos> 0 ) && cIdx == 0 )
    MtsDcOnly = 0
  QState= 0
  for( i = lastSubBlock; i >= 0; i-- ) {
    startQStateSb = QState
    xS = DiagScanOrder[ log2TbWidth - log2SbW ][ log2TbHeight - log2SbH ]
                     [ i ][ 0 ]
    yS = DiagScanOrder[ log2TbWidth - log2SbW ][ log2TbHeight - log2SbH ]
                     [ i ][ 1 ]
    inferSbDcSigCoeffFlag = 0
    if( i < lastSubBlock && i> 0 ) {
      sb_coded_flag[ xS ][ yS ]
      inferSbDcSigCoeffFlag = 1
    }
    if( sb_coded_flag[ xS ][ yS ] && ( xS > 3 || yS > 3 ) && cIdx == 0 )
      MtsZeroOutSigCoeffFlag = 0
    firstSigScanPosSb = numSbCoeff
    lastSigScanPosSb = -1
    firstPosMode0 = ( i == lastSubBlock ? lastScanPos : numSbCoeff - 1 )
    firstPosMode1 = firstPosMode0
    for( n = firstPosMode0; n >= 0 && remBinsPass1 >= 4; n-- ) {
``` | ae(v)<br><br>ae(v)<br><br>ae(v)<br><br>ae(v)<br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br>ae(v) |

TABLE 2-continued

| | Descriptor |
|---|---|
| ```
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( sb_coded_flag[ xS ][ yS ] && ( n > 0 || !inferSbDcSigCoeffFlag ) &&
            ( xC != LastSignificantCoeffX || yC != Last SignificantCoeffY ) ) {
          sig_coeff_flag[ xC ][ yC ]
          remBinsPass1− −
          if( sig_coeff_flag[ xC ][ yC ] )
            inferSbDcSigCoeffFlag = 0
        }
        if( sig_coeff_flag[ xC ][ yC ] ) {
          abs_level_gtx_flag[ n ][ 0 ]
          remBinsPass1− −
          if( abs_level_gtx_flag[ n ][ 0 ] ) {
            par_level_flag[ n ]
            remBinsPass1− −
            abs_level_gtx_flag[ n ][ 1 ]
            remBinsPass1− −
          }
          if( lastSigScanPosSb == −1 )
            lastSigScanPosSb = n
          firstSigScanPosSb = n
        }
        AbsLevelPass1[ xC ][ yC ] = sig_coeff_flag[ xC ][ yC ] + par_level_flag[ n ] +
            abs_level_gtx_flag[ n ][ 0 ] + 2 * abs_level_gtx_flag[ n ][ 1 ]
        if( sh_dep_quant_used_flag )
          QState = QStateTransTable[ QState ][ AbsLevelPass1[ xC ][ yC ] & 1 ]
      firstPosMode1 = n − 1
    }
    for( n = firstPosMode0; n > firstPosMode1; n− − ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( abs_level_gtx_flag[ n ][ 1 ] )
        abs_remainder[ n ]
      AbsLevel[ xC ][ yC ] = AbsLevelPass1[ xC ][ yC ] +2 * abs_remainder[ n ]
    }
    for( n = firstPosMode1; n >= 0; n− − ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( sb_coded_flag[ x ][ yS ] )
        dec_abs_level[ n ]
      if( AbsLevel[ xC ][ yC ] > 0 ) {
        if( lastSigScanPosSb == −1 )
          lastSigScanPosSb = n
        firstSigScanPosSb = n
      }
      if( sh_dep_quant_used_flag )
        QState = QStateTransTable[ QState ][ AbsLevel[ xC ][ yC ] & 1 ]
    }
    signHiddenFlag = sh_sign_data_hiding_used_flag &&
        ( lastSigScanPosSb − firstSigScanPosSb > 3 ? 1 : 0 )
    for( n = numSbCoeff − 1; n >= 0; n− − ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( ( AbsLevel[ xC ][ yC ] > 0 ) &&
          ( !signHiddenFlag || ( n != firstSigScanPosSb ) ) )
        coeff_sign_flag[ n ]
    }
    if( sh_dep_quant_used_flag ) {
      QState = startQStateSb
      for( n = numSbCoeff − 1; n >= 0; n− − ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( AbsLevel[ xC ][ yC ] > 0)
          TransCoeffLevel[ x0 ][ y0 ][ cIdx ][ xC ][ yC ] =
              ( 2 * AbsLevel[ xC ][ yC ] − ( QState > 1 ? 1 : 0 ) ) *
              ( 1 − 2 * coeff_sign_flag[ n ] )
        QState = QStateTransTable[ QState ][ AbsLevel[ xC ][ yC ] & 1 ]
    } else {
      sumAbsLevel = 0
      for( n = numSbCoeff − 1; n >= 0; n− − ){
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( AbsLevel[ xC ][ yC ] > 0 ) {
          TransCoeffLevel[ x0 ][ y0 ][ cIdx ][ xC ][ yC ] =
              AbsLevel[ xC ][ yC ] * ( 1 − 2 * coeff_sign_flag[ n ] )
          if( signHiddenFlag ) {
            sumAbsLevel += AbsLevel[ xC ][ yC ]
            if( ( n == firstSigScanPosSb ) && ( sumAbsLevel % 2 == 1 ) )
``` | ae(v)<br><br><br><br><br>ae(v)<br><br><br>ae(v)<br><br>ae(v)<br><br><br><br><br><br><br><br><br><br><br><br><br><br><br><br><br><br>ae(v)<br><br><br><br><br><br><br>ae(v)<br><br><br><br><br><br><br><br><br><br><br><br><br><br>ae(v) |

TABLE 2-continued

| | Descriptor |
|---|---|
| `TransCoeffLevel[ x0 ][ y0 ][ cIdx ][ xC ][ yC ] =`<br>    `-TransCoeffLevel[ x0 ][ y0 ][ cIdx ][ xC ][ yC ]`<br>        `}`<br>      `}`<br>    `}`<br>  `}`<br>`}`<br>`}` | |

In Table 1 and Table 2, transform skip flag represents whether the transform for the associated block is omitted. The transform skip flag may be a syntax element of the transform skip flag. The associated block may be a coding block (CB) or a transform block (TB). With respect to the transform (and quantization) and residual coding procedure, the CB and the TB may be interchangeably used. For example, residual samples may be derived with respect to the CB, and (quantized) transform coefficients may be derived through the transform and quantization for the residual samples. Through the residual coding procedure, information (e.g., syntax elements) efficiently representing the location, size, sign, and the like of the (quantized) transform coefficients may be generated and signaled. The quantized transform coefficients may be simply called transform coefficients. In general, if the CB is not larger than the maximum TB, the size of the CB may be equal to the size of the TB, and in this case, the target block being transformed (and quantized) and residual-coded may be called the CB or the TB. Meanwhile, if the CB is larger than the maximum TB, the target block being transformed (and quantized) and residual-coded may be called the TB. Hereinafter, although it is explained that the syntax elements related to the residual coding are signaled in the unit of a transform block (TB), this is merely exemplary, and the TB may be interchangeably used with the CB as described above.

The syntax for the residual coding according to the transform skip flag may be the same as that in Table 3 or Table 4.

TABLE 3

| | Descriptor |
|---|---|
| `residual_ts_coding( x0, y0, log2TbWidth, log2TbHeight, cIdx ) {`<br>  `log2SbSize = ( Min( log2TbWidth, log2TbHeight ) < 2 ? 1 : 2 )`<br>  `numSbCoeff = 1 << (log2SbSize << 1 )`<br>  `lastSubBlock = ( 1 << ( log2TbWidth + log2TbHeight − 2 * log2SbSize ) ) − 1`<br>  `inferSbCbf = 1`<br>  `MaxCcbs = 2 * ( 1 << log2TbWidth ) * ( 1<<log2TbHeight )`<br>  `for( i =0; i <= lastSubBlock; i++ ) {`<br>    `xS = DiagScanOrder[ log2TbWidth − log2SbSize ][ log2TbHeight − log2SbSize ][ i ][ 0 ]`<br>    `yS = DiagScanOrder[ log2TbWidth − log2SbSize ][ log2TbHeight − log2SbSize ][ i ][ 1 ]`<br>    `if( ( i != lastSubBlock || !inferSbCbf ) {`<br>      `coded_sub_block_flag[ xS ][ yS ]` | `ae(v)` |
|     `}`<br>    `if( coded_sub_block_flag[ xS ][ yS ] && i < lastSubBlock )`<br>      `inferSbCbf = 0`<br>`/* First scan pass */`<br>  `inferSbSigCoeffFlag = 1`<br>  `for( n = 0; n <= numSbCoeff − 1; n++ ) {`<br>    `xC = ( xS << log2SbSize ) + DiagScanOrder[ log2SbSize ][ log2SbSize ][ n ][ 0 ]`<br>    `yC = ( yS << log2SbSize ) + DiagScanOrder[ log2SbSize ][ log2SbSize ][ n ][ 1 ]`<br>    `if( coded_sub_block_flag[ xS ][ yS ] &&`<br>      `( n != numSbCoeff − 1 || !inferSbSigCoeffFlag ) ) {`<br>      `sig_coeff_flag[ xC ][ yC ]` | `ae(v)` |
|       `MaxCcbs−−`<br>      `if( sig_coeff_flag[ xC ][ yC ] )`<br>        `inferSbSigCoeffFlag = 0`<br>    `}`<br>    `CoeffSignLevel[ xC ][ yC ] = 0`<br>    `if( sig_coeff_flag[ xC ][ yC ] {`<br>      `coeff_sign_flag[ n ]` | `ae(v)` |
|       `MaxCcbs−−`<br>      `CoeffSignLevel[ xC ][ yC ] = ( coeff_sign_flag[ n ] > 0 ? −1 : 1 )`<br>      `abs_level_gtx_flag[ n ][ 0 ]` | `ae(v)` |
|       `MaxCcbs−−`<br>      `if( abs_level_gtx_flag[ n ][ 0 ] ) {`<br>        `par_level_flag[ n ]` | `ae(v)` |
|         `MaxCcbs−−`<br>      `}`<br>    `}`<br>    `AbsLevelPassX[ xC ][ yC ] =`<br>      `sig_coeff_flag[ xC ][ yC ] + par_level_flag[ n ] + abs_level_gtx_flag[ n ][ 0 ]`<br>  `}`<br>`/* Greater than X scan pass (numGtXFlags=5) */`<br>  `for( n = 0; n <= numSbCoeff − 1; n++ ) {` | |

TABLE 3-continued

| | Descriptor |
|---|---|
| ```
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
    for( j = 1; j < 5; j++ ) {
        if( abs_level_gtx_flag[ n ][ j − 1 ] )
            abs_level_gtx_flag[ n ][ j ]
            MaxCcbs−−
            AbsLevelPassX[ xC ][ yC ] + = 2 * abs_level_gtx_flag[ n ][ j ]
        }
    }
/* remainder scan pass */
    for( n = 0; n <= numSbCoeff − 1; n++ ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs_level_gtx_flag[ n ][ 4 ] )
            abs_remainder[ n ]
        if( intra_bdpcm_flag == 0 ) {
            absRightCoeff = abs( TransCoeffLevel[ x0 ][ y0 ][ cIdx ][ xC − 1 ][ yC ] )
            absBelowCoeff = abs( TransCoeffLevel[ x0 ][ y0 ][ cIdx ][ xC ][ yC − 1 ] )
            predCoeff = Max( absRightCoeff, absBelowCoeff )
            if( AbsLevelPassX[ xC ][ yC ] + abs_remainder[ n ] == 1 && predCoeff>
0 )
                TransCoeffLevel[ x0 ][ y0 ][ cIdx ][ xC ][ yC ] =
                    ( 1 − 2 * coeff_sign_flag[ n ] ) * predCoeff
            else if( AbsLevelPassX[ xC ][ yC ] + abs_remainder[ n ] <= predCoeff )
                TransCoeffLevel[ x0 ][ y0 ][ cIdx ][ xC ][ yC ] = ( 1 − 2 * coeff_sign_flag[ n ] ) *
                    ( AbsLevelPassX[ xC ][ yC ] + abs_remainder[ n ] − 1)
            else
                TransCoeffLevel[ x0 ][ y0 ][ cIdx ][ xC ][ yC ] = ( 1 − 2 * coeff_sign_flag[ n ] ) *
                    ( AbsLevelPassX[ xC ][ yC ] + abs_remainder[ n ] )
        } else
            TransCoeffLevel[ x0 ][ y0 ][ cIdx ][ xC ][ yC ] = ( 1 − 2 * coeff_sign_flag[ n ] ) *
                ( AbsLevelPassX[ xC ][ yC ] + abs_remainder[ n ] )
    }
}
}
``` | ae(v)<br><br><br><br><br><br><br>ae(v) |

TABLE 4

| | Descriptor |
|---|---|
| ```
residual_ts_coding( x0, y0, log2TbWidth, log2TbHeight, cIdx ) {
    log2SbW = ( Min( log2TbWidth, log2TbHeight ) < 2 ? 1 : 2 )
    log2SbH = log2SbW
    if( log2TbWidth + log2TbHeight > 3 )
        if( log2TbWidth < 2 ) {
            log2SbW = log2TbWidth
            log2SbH = 4 − log2SbW
        } else if( log2TbHeight < 2 ) {
            log2SbH = log2TbHeight
            log2SbW = 4 − log2SbH
        }
    numSbCoeff = 1 << ( log2SbW + log2SbH )
    lastSubBlock = ( 1 << ( log2TbWidth + log2TbHeight − ( log2SbW + log2SbH ) ) ) − 1
    inferSbCbf = 1
    RemCcbs = ( ( 1 << ( log2TbWidth + log2TbHeight ) ) * 7 ) >> 2
    for( i =0; i <= lastSubBlock; i++ ) {
        xS = DiagScanOrder[ log2TbWidth − log2SbW ][ log2TbHeight − log2SbH ][ i ][ 0 ]
        yS = DiagScanOrder[ log2TbWidth − log2SbW ][ log2TbHeight − log2SbH ][ i ][ 1 ]
        if( i != lastSubBlock || !inferSbCbf )
            sb_coded_flag[ xS ][ yS ]
        if( sb_coded_flag[ xS ][ yS ] && i < lastSubBlock )
            inferSbCbf = 0
/* First scan pass */
        inferSbSigCoeffFlag = 1
        lastScanPosPass1 = − 1
        for( n = 0; n numSbCoeff − 1 && RemCcbs >= 4; n++ ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            lastScanPosPass1 = n
            if( sb_coded_flag[ xS ][ yS ] &&
                ( n != numSbCoeff − 1 || !inferSbSigCoeffFlag ) ) {
                sig_coeff_flag[ xC ][ yC ]
                RemCcbs−−
                if( sig_coeff_flag[ xC][ yC ] )
                    inferSbSigCoeffFlag = 0
``` | <br><br><br><br><br><br><br><br><br><br><br><br><br><br><br><br>ae(v)<br><br><br><br><br><br><br><br><br><br>ae(v) |

TABLE 4-continued

| | Descriptor |
|---|---|
| ```
        }
        CoeffSignLevel[ xC ][ yC ] = 0
        if( sig_coeff_flag[ xC ][ yC ] ) {
          coeff_sign_flag[ n ]
``` | ae(v) |
| ```
          RemCcbs−−
          CoeffSignLevel[ xC ][ yC ] = ( coeff_sign_flag[ n ] > 0 ? −1 : 1 )
          abs_level_gtx_flag[ n ][ 0 ]
``` | ae(v) |
| ```
          RemCcbs−−
          if( abs_level_gtx_flag[ n ][ 0 ] ) {
            par_level_flag[ n ]
``` | ae(v) |
| ```
            RemCcbs−−
          }
        }
        AbsLevelPass1[ xC ][ yC ] =
            sig_coeff_flag[ xC ][ yC ] + par_level_flag[ n ] + abs_level_gtx_flag[ n ][ 0 ]
      }
      /* Greater than X scan pass (numGtXFlags=5) */
      lastScanPosPass2 = −1
      for( n = 0; n <= numSbCoeff − 1 && RemCcbs >= 4; n++ ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        AbsLevelPass2[ xC ][ yC ] = AbsLevelPass1[ xC ][ yC ]
        for( j = 1; j < 5; j++ ) {
          if( abs_level_gtx_flag[ n ][ j − 1 ] ) {
            abs_level_gtx_flag[ n ][ j ]
``` | ae(v) |
| ```
            RemCcbs−−
          }
          AbsLevelPass2[ xC ][ yC ] += 2 * abs_level_gtx_flag[ n ][ j ]
        }
        lastScanPosPass2 = n
      }
      /* remainder scan pass */
      for( n = 0; n <= numSbCoeff − 1; n++ ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( ( n <= lastScanPosPass2 && AbsLevelPass2[ xC ][ yC ] >= 10 ) ||
            ( n > lastScanPosPass2 && n <= lastScanPosPass1 &&
              AbsLevelPass1[ xC ][ yC ] >= 2 ) ||
            ( n > lastScanPosPass1 && sb_coded_flag[ xS ][ yS ] ) )
          abs_remainder[ n ]
``` | ae(v) |
| ```
        if( n <= lastScanPosPass2 )
          AbsLevel[ xC ][ yC ] = AbsLevelPass2[ xC ][ yC ] + 2 * abs_remainder[ n ]
        else if( n <= lastScanPosPass1 )
          AbsLevel[ xC ][ yC ] = AbsLevelPass1[ xC ][ yC ] + 2 * abs_remainder[ n ]
        else { /* bypass */
          AbsLevel[ xC ][ yC ] = abs_remainder[ n ]
          if( abs_remainder[ n ] )
            coeff_sign_flag[ n ]
``` | ae(v) |
| ```
        }
        if( BdpcmFlag[ x0 ][ y0 ][ cIdx ] == 0 && n <= lastScanPosPass1 ) {
          absLeftCoeff = xC > 0 ? AbsLevel[ xC − 1 ][ yC ] ) : 0
          absAboveCoeff = yC > 0 ? AbsLevel[ xC ][ yC − 1 ] ) : 0
          predCoeff = Max( absLeftCoeff, absAboveCoeff )
          if( AbsLevel[ xC ][ yC ] == 1 && predCoeff> 0 )
            AbsLevel[ xC ][ yC ] = predCoeff
          else if( AbsLevel[ xC ][ yC ] > 0 && AbsLevel[ xC ][ yC ] <= predCoeff )
            AbsLevel[ xC ][ yC ]−−
        }
        TransCoeffLevel[ x0 ][ y0 ][ cIdx ][ xC ][ yC ] = ( 1 − 2 * coeff_sign_flag[ n ] ) *
            AbsLevel[ xC ][ yC ]
      }
    }
  }
``` | |

According to the present embodiment, the residual coding may be branched according to the value of the transform skip flag transform_skip_flag. That is, different syntax elements may be used for the residual coding based on the value of the transform_skip_flag (based on whether to skip the transform). The residual coding being used in case that the transform skip is not applied (i.e., in case that the transform is applied) may be called regular residual coding (RRC), and the residual coding in case that the transform skip is not applied (i.e., in case that the transform is not applied) may be called transform skip residual coding (TSRC). Further, the regular residual coding may also be called general residual coding. Further, the regular residual coding may be called a regular residual coding syntax structure, and the transform skip residual coding may be called a transform skip residual coding syntax structure. Table 1 and Table 2 may represent a residual coding syntax element in case that the value of transform_skip_flag is 0, that is, in case that the transform is applied, and Table 3 and Table 4 may represent a residual coding syntax element in case that the value of transform_skip_flag is 1, that is, in case that the transform is not applied.

Specifically, as an example, the transform_skip_flag indicating whether the transform of the transform block is skipped may be parsed, and whether the transform_skip_flag is 1 may be determined. If the value of the transform_skip_flag is 0, syntax elements last_sig_coeff_x_prefix, last_sig_coeff_y_prefix, last_sig_coeff_x_suffix, last_sig_coeff_y_suffix, sb_coded_flag, sig_coeff_flag, abs_level_gtx_flag, par_level_flag, abs_remainder, dec_abs_level, and/or coeff_sign_flag for residual coefficients of the transform block as illustrated in Table 1 or Table 2 may be parsed, and the residual coefficients may be derived based on the syntax elements. In this case, the syntax elements may be sequentially parsed, and the parsing order may be changed. Further, the abs_level_gtx_flag may represent the abs_level_gt1_flag and/or the abs_level_gt3_flag. For example, the abs_level_gtx_flag[n][0] may be an example of the first transform coefficient level flag abs_level_gt1_flag, and the abs_level_gtx_flag[n][1] may be an example of the second transform coefficient level flag abs_level_gt3_flag.

In an embodiment, the encoding apparatus may encode (x, y) position information of the last non-zero transform coefficient in a transform block based on the syntax elements last_sig_coeff_x_prefix, last_sig_coeff_y_prefix, last_sig_coeff_x_suffix, and last_sig_coeff_y_suffix. More specifically, the last_sig_coeff_x_prefix represents a prefix of a column position of a last significant coefficient in a scanning order within the transform block, the last_sig_coeff_y_prefix represents a prefix of a row position of the last significant coefficient in the scanning order within the transform block, the last_sig_coeff_x_suffix represents a suffix of a column position of the last significant coefficient in the scanning order within the transform block, and the last_sig_coeff_y_suffix represents a suffix of a row position of the last significant coefficient in the scanning order within the transform block. Here, the significant coefficient may represent a non-zero coefficient. In addition, the scanning order may be a right diagonal scanning order. Alternatively, the scanning order may be a horizontal scanning order or a vertical scanning order. The scanning order may be determined based on whether intra/inter prediction is applied to a target block (a CB or a CB including a TB) and/or a specific intra/inter prediction mode.

Thereafter, the encoding apparatus may divide the transform block into 4×4 sub-blocks, and then indicate whether there is a non-zero coefficient in the current sub-block using a 1-bit syntax element coded_sub_block_flag for each 4×4 sub-block.

If a value of coded_sub_block_flag is 0, there is no more information to be transmitted, and thus, the encoding apparatus may terminate the encoding process on the current sub-block. Conversely, if the value of coded_sub_block_flag is 1, the encoding apparatus may continuously perform the encoding process on sig_coeff_flag. Since the sub-block including the last non-zero coefficient does not require encoding for the coded_sub_block_flag and the sub-block including the DC information of the transform block has a high probability of including the non-zero coefficient, coded_sub_block_flag may not be coded and a value thereof may be assumed as 1.

If the value of coded_sub_block_flag is 1 and thus it is determined that a non-zero coefficient exists in the current sub-block, the encoding apparatus may encode sig_coeff_flag having a binary value according to a reverse scanning order. The encoding apparatus may encode the 1-bit syntax element sig_coeff_flag for each transform coefficient according to the scanning order. If the value of the transform coefficient at the current scan position is not 0, the value of sig_coeff_flag may be 1. Here, in the case of a subblock including the last non-zero coefficient, sig_coeff_flag does not need to be encoded for the last non-zero coefficient, so the coding process for the sub-block may be omitted. Level information coding may be performed only when sig_coeff_flag is 1, and four syntax elements may be used in the level information encoding process. More specifically, each sig_coeff_flag[xC][yC] may indicate whether a level (value) of a corresponding transform coefficient at each transform coefficient position (xC, yC) in the current TB is non-zero. In an embodiment, the sig_coeff_flag may correspond to an example of a syntax element of a significant coefficient flag indicating whether a quantized transform coefficient is a non-zero significant coefficient.

The remaining level value after encoding of the sig_coeff_flag may be derived as in the following equation. That is, the syntax element remAbsLevel representing the level value to be encoded may be derived as in the following equation.

remAbsLevel[n]=|coeff[n]|−1        [Equation 1]

Here, coeff[n] means a real transform coefficient value.

Further, the abs_level_gtx_flag[n][0] may represent whether the remAbsLevel[n] at a corresponding scanning position n is larger than 1. For example, if the value of the abs_level_gtx_flag[n][0] is 0, an absolute value of the transform coefficient at the corresponding position may be 1. Further, if the value of the abs_level_gtx_flag[n][0] is 1, the remAbsLevel[n] representing the level value to be encoded hereinafter may be updated as in the equation below.

remAbsLevel[n]=remAbsLevel[n]−1        [Equation 2]

Further, the value of the least significant coefficient (LSB) of the remAbsLevel[n] described in Equation 2 may be encoded through the par_level_flag as in Equation 3 below.

par_level_flag[n]=remAbsLevel[n]& 1        [Equation 3]

Here, par_level_flag[n] may represent a parity of the transform coefficient level (value) at the scanning position n.

After the par leve flag[n] is encoded, the transform coefficient level value remAbsLevel[n] to be encoded may be updated as in the following equation.

remAbsLevel[n]=remAbsLevel[n]>>1        [Equation 4]

abs_level_gtx_flag[n][1] may represent whether the remAbsLevel at the corresponding scanning position n is larger than 3. Only in case that the abs_level_gtx_flag[n][1] is 1, encoding of the abs_remainder[n] can be performed. The relationship between the real transform coefficient value coeff and each syntax element may be as in the following equation.

|coeff[n]|=sig_coeff_flag[b]+abs_level_gtX_flag[n][0]+par_level_flag[n]+2*(abs_level_gtX_flag[n][1]+abs_remainder[n])        [Equation 5]

Further, the following Table 5 represents examples related to the above-described Equation 5.

TABLE 5

| |coeff[n]| | sig_coeff_flag[n] | abs_level_gtX_flag[n][0] | par_level_flag[n] | abs_level_gtX_flag[n][1] | abs_remainder[n] |
|---|---|---|---|---|---|
| 0 | 0 | | | | |
| 1 | 1 | 0 | | | |
| 2 | 1 | 1 | 0 | 0 | |

TABLE 5-continued

| \|coeff[n]\| | sig_coeff_flag[n] | abs_level_gtX_flag[n][0] | par_level_flag[n] | abs_level_gtX_flag[n][1] | abs_remainder[n] |
|---|---|---|---|---|---|
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | | |

Here, |coeff[n]| represents the transform coefficient level (value), and may be indicated as AbsLevel for the transform coefficient. Further, the sign of each coefficient may be encoded using coeff_sign_flag that is a one-bit symbol.

Further, as another example, if the value of the transform_skip_flag is 1, syntax elements sb_coded_flag, sig_coeff_flag, coeff_sign_flag, abs_level_gtx_flag, par_level_flag, and/or abs_remainder for the residual coefficient of the transform block as shown in Table 3 or Table 4 may be parsed, and the residual coefficient may be derived based on the syntax elements. In this case, the syntax elements may be sequentially parsed, or the parsing order may be changed. Further, the abs_level_gtx_flag may represent abs_level_gt1_flag, abs_level_gt3_flag, abs_level_gt5_flag, abs_level_gt7 flag, and/or abs_level_gt9 flag. For example, abs_level_gtx_flag[n][j] may be a flag representing whether an absolute value or level (value) of the transform coefficient at the scanning position n is larger than (j<<1)+1. In some cases, the (j<<1)+1 may be replaced by a predetermined threshold value, such as a first threshold value or a second threshold value.

Meanwhile, the CABAC provides high performance, but has the disadvantage that the throughput performance is not good. This is caused by the regular encoding engine of the CABAC, and since the regular encoding (encoding through the regular encoding engine of the CABAC) uses the probability state and range updated through encoding of the previous bin, it may show high data dependency, and it may take a lot of time to read the probability interval and to determine the current state. The throughput problem of the CABAC may be solved by limiting the number of context-coded bins. For example, as in the above-described Table 5, the sum of bins used to express the sig_coeff_flag[n], abs_level_gtx_flag[n][0], par_level_flag[n], and abs_level_gtx_flag[n][1] may be limited to 1.75 per pixel in the transform block depending on the size of the transform block. In this case, if all of the limited number of context-coded bins are used to encode the context element, the encoding apparatus may perform the bypass coding by binarizing the remaining coefficients through a binarization method to be described later without using the context coding. In other words, if the number of coded context-coded bins becomes TU width * TU height * 1.75 in TU, the sig_coeff_flag[n], abs_level_gtx_flag[n][0], par_level_flag[n], and abs_level_gtx_flag[n][1], which are coded as the context-coded bins, may not be coded any more, and the value of |coeff[n]| may be directly coded into dec_abs_level[n] as in the following Table 6.

TABLE 6

| \|coeff[n]\| | dec_abs_level[n] |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| ... | ... |

In this case, the sign of each coefficient may be coded using coeff_sign_flag[n] that is a one-bit symbol.

Figure 5:
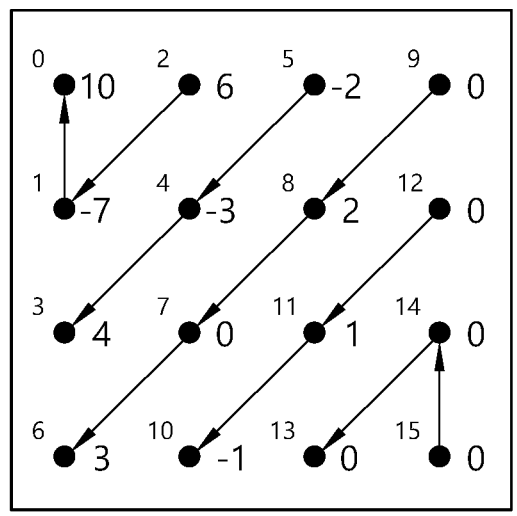
FIG. 5 exemplarily illustrates transform coefficients in a 4×4 block.

FIG. 5 exemplarily illustrates transform coefficients in a 4×4 block.

The 4×4 block of FIG. 5 represents an example of quantized coefficients. The block illustrated in FIG. 5 may be a 4×4 transform block, or may be a 4×4 subblock of an 8×8, 16×16, 32×32, or 64×64 transform block. The 4×4 block of FIG. 5 may represent a luma block or a chroma block. However, this is merely exemplary, and in the present embodiment, the transform of a large block size (maximum 64×64 size) is possible, and this may be useful for a high-resolution video (e.g., 1080p and 4K sequence). The high-frequency transform coefficients may be zeroed with respect to the transform block of which the size (width or height or both width and height) is 64, and only low-frequency coefficients may be maintained. For example, in case of the M×N transform block having the block width of M and the block height of N, only 32 left columns of the transform coefficients may be maintained when M is 64. Further, only 32 top rows of the transform coefficients may be maintained when N is 64.

In case that the transform skip mode is used for a block having a large size, the whole block may be used without being zeroed even with respect to any values. Since the maximum transform size configurable in SPS is supported, the encoding apparatus may adaptively select the transform size having a length of 16, 32, or 64 at maximum in accordance with necessity of a specific implementation. Specifically, binarization of the coefficient position coding that is not the last 0 may be coded based on the reduced TU size, and the selection of the context model for the coefficient position coding that is not the last 0 may be determined by the original TU size.

In FIG. 5, as an example, the encoding results for the coefficients being scanned reverse diagonally are illustrated. In FIGS. 5, n (0 to 15) designates the scan position of the coefficients according to the reverse diagonal scan. If n is 15, it represents the coefficient at the bottom right corner, which is firstly scanned in the 4×4 block, and if n is 0, it represent the coefficient at the top left corner, which is lastly scanned.

Meanwhile, as described above, if the input signal is not a binary value, but is the syntax element, the encoding apparatus may transform the input signal into a binary value by binarizing the value of the input signal. Further, the decoding apparatus may derive the binarized value (i.e., binarized bin) of the syntax element by decoding the syntax element, and may derive the value of the syntax element by reversely binarizing the binarized value. The binarization process may be performed as a truncated rice (TR) binarization process, a k-th order Exp-Golomb (EGk) binarization process, a limited k-th order Exp-Golomb (limited EGk) or fixed-length (FL) binarization process to be described later. Further, the reverse binarization process may be performed based on the TR binarization process, the EGk binarization process, the limited EGk binarization process, or the FL binarization process, and may represent a process of deriving the value of the syntax element.

For example, the TR binarization process may be performed as follows.

An input of the TR binarization process may be a request for TR binarization and cMax and cRiceParam for the syntax element. Further, an output of the TR binarization process may be the TR binarization for a value symbolVal corresponding to a bin string.

As an example, if a suffix bin string for the syntax element is present, the TR bin string for the syntax element may be a concatenation of a prefix bin string and a suffix bin string, and if the suffix bin string is not present, the TR bin string for the syntax element may be the prefix bin string. For example, the prefix bin string may be derived as follows.

The prefix value of the symbolVal may be derived as in the following equation.

$$prefixVal=symbolVal>>cRiceParam \quad \text{[Equation 6]}$$

Here, prefixVal may represent a prefix value of symbolVal. The prefix of the TR bin string (i.e., prefix bin string) may be derived as follows.

For example, if the prefixVal is smaller than cMax>>cRiceParam, the prefix bin string may be a bit string having a length of prefixVal+1, which is indexed by binIdx. That is, if the prefixVal is smaller than cMax>>cRiceParam, the prefix bin string may be a bit string having the number of bits prefixVal+1 indicated by the binIdx. The bin for the binIdx that is smaller the prefixVal may be 1. Further, the bin for the binIdx equal to the prefixVal may be 0.

For example, a bin string derived as unary binarization for the prefixVal may be as in Table 7 below.

TABLE 7

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Meanwhile, if the prefixVal is not smaller than cMax>>cRiceParam, the prefix bin string may be a bit string of which the length is the cMax>>cRiceParam and of which all bins are 1.

Further, the suffix bin string of the TR bin string may be present in case that the cMax is larger than the symbolVal and the cRiceParam is larger than 0. For example, the prefix bin string may be derived as follows.

The suffix value of the symbolVal for the syntax element may be derived as in the following equation.

$$prefixVal=symbolVal=((prefixVal)<<cRiceParam) \quad \text{[Equation 7]}$$

Here, the suffixVal may represent a suffix value of the symbolVal.

The suffix (i.e., suffix bin string) of the TR bin string may be derived based on an FL binarization process for the suffixVal of which the cMax value is 1<<cRiceParam)-1.

For the input parameter cRiceParam=0, the TR binarization is exactly a truncated unary binarization and it is always invoked with a cMax value equal to the largest possible value of the syntax element being decoded.

Meanwhile, the EGk binarization process may be performed as follows.

The input of the EGk binarization process may be a request for the EGk binarization. Further, the output of the EGk binarization process may be the EGk binarization for the value symbolVal corresponding to the bin string.

The bit string of the EGk binarization process for the symbolVal may be derived as follows.

TABLE 8

```
absV = Abs( symbolVal )
stopLoop = 0
do
    if( absV >= ( 1 << k ) ) {
        put( 1 )
        absV = absV − ( 1 << k )
        k++
    } else {
        put( 0 )
        while( k− − )
            put( ( absV >> k ) & 1 )
        stopLoop = 1
    }
while( !stopLoop )
```

Referring to Table 8, a binary value X may be added at the end of a bin string through each call of put(X). Here, X may be 0 or 1.

Further, a limited EGk binarization process may be performed as follows.

The input of the limited EGk binarization process may be a request for the limited EGk binarization and the rice parameter riceParam. Further, the output of the limited EGk binarization process may be the limited EGk binarization for the value symbolVal related to the corresponding bin string.

The bin string of the limited EGk binarization process for the symbolVal may be derived as follows.

TABLE 9

```
codeValue = symbolVal >> riceParam
preExtLen = 0
while( ( preExtLen < maxPreExtLen ) && ( codeValue > ( ( 2 << preExtLen ) − 2 ) ) ) {
    preExtLen++
    put( 1 )
}
if( preExtLen = = maxPreExtLen )
    escapeLength = log2TransformRange
else {
    escapeLength = preExtLen + riceParam
    put( 0 )
}
symbolVal = symbolVal − ( ( ( 1 << preExtLen ) − 1 ) << riceParam )
while( ( escapeLength− − ) > 0 )
    put( ( symbolVal >> escapeLength ) & 1 )
```

Referring to Table 9, a binary value X may be added at the end of the bin string through each call of put(X) Here, X may be 0 or 1.

Variables log2TransformRange and maxPrefixExtensionLength may be derived as follows.

$$\text{log2TransformRange}=15$$

$$\text{maxPrefixExtensionLength}=26-\text{log2TransformRange} \quad \text{[Equation 8]}$$

Further, the FL binarization process may be performed as follows.

The input of the FL binarization process may be a request for the FL binarization and cMax for the syntax element. Further, the output of the FL binarization process may be the FL binarization for the value symbolVal corresponding to the bin string.

The FL binarization may be configured using the bin string having the number of bits of a fixed length of the symbol value symbolVal. Here, the fixed length may be derived as in the following equation.

$$\text{fixedLength}=\text{Ceil}(\text{Log2}(\text{cMax}+1)) \quad \text{[Equation 9]}$$

That is, the bin string for the symbol value symbolVal may be derived through the FL binarization, and the bin length (i.e., the number of bits) of the bin string may be the fixed length.

Indexing of bins for the FL binarization may be a method for using a value increasing in order from the most significant bit to the least significant bit. For example, the bin index related to the most significant bit may be binIdx=0.

Meanwhile, a binarization process for a syntax element abs_remainder[n] among residual information may be performed as follows.

The input of the binarization process for the abs_remainder[n] may be a request for binarization of the syntax element abs_remainder[n], color component cIdx, luma position (x0, y0) representing the top left sample of the current luma transform block based on the top left luma sample of a picture, current coefficient scan position (xC, yC), binary logarithm of the transform block width longTbWidth, and binary logarithm of the transform block height log2TbHeight. The output of the binarization process for the abs_remainder may be binarization of the abs_remainder (i.e., binarized bin string of the abs_remainder). Through the binarization process, available bin strings for the abs_remainder may be derived.

The rice parameter cRiceParam for the abs_remainder[n] may be derived through a rice parameter deriving process being performed through inputting of the color component cIdx and the luma position (x0, y0), the current coefficient scan position (xC, yC), log2TbWidth that is the binary logarithm of the width of the transform block, and log2TbHeight that is the binary logarithm of the height of the transform block. The rice parameter deriving process will be described in detail later.

The cMax for the abs_remainder[n] being currently coded may be derived based on the rice parameter cRiceParam. For example, the cMax may be derived as in the following equation.

$$\text{cMax}=6<<\text{cRiceParam} \quad \text{[Equation 10]}$$

Meanwhile, in case that the suffix bin string is present, the binarization for the syntax element abs_remainder[n], that is, the bin string for the abs_remainder[n] may be the concatenation of the prefix bin string and the suffix bin string. In case that the suffix bin string is not present, the bin string for the abs_remainder[n] may be the prefix bin string.

For example, the prefix bin string for the abs_remainder[n] may be derived as follows.

The prefix value prefixVal of the abs_remainder[n] may be derived as in the following equation.

$$\text{prefixVal}=\text{Min (cMac, abs\_remainder[n])} \quad \text{[Equation 11]}$$

The prefix bin string of the abs_remainder[n] may be derived through the TR binarization process for the prefixVal using the cMax and the cRiceParam as an input.

If the prefix bin string is equal to a bit string of which all bits are 1 and the bit length is 6, the suffix bin string of the abs_remainder[n] may be present, and may be derived as follows.

The suffix value suffixVal of the abs_remainder[n] may be derived as in the following equation.

$$\text{sufficVal}=\text{abs\_remainder[n]}-\text{cMax} \quad \text{[Equation 12]}$$

The suffix bin string of the abs_remainder[n] may be derived through the limited EGk binarization process for the binarization of the suffixVal that uses cRiceParam+1 and cRiceParam as an input.

The rice parameter for the abs_remainder[n] may be derived by the following process.

The input of the rice parameter deriving process may be a base level baseLevel, a color component index cIdx, a luma position (x0, y0), a current coefficient scan position (xC, yC), a binary logarithm log2TbWidth of the width of the transform block and a binary logarithm log2TbHeight of the height of the transform block. The luma position (x0, y0) may represent the top left sample of the current luma transform block based on the top left luma sample of the picture. The output of the rice parameter deriving process may be the rice parameter cRiceParam.

For example, the variable locSumAbs may be derived by a pseudo code disclosed in the following table based on the arrangement AbsLevel[x][y] for the given component index cIdx and the transform block having the top left luma position (x0, y0).

TABLE 10

```
- If transform_skip_flag[ x0 ][ y0 ] is equal to 1,
    trafoSkip is set equal to 1 and the following
      applies:
        locSumAbs - 0
        if( xC > 0 )
          locSumAbs += AbsLevel[ xC - 1 ][ yC ]
        if( yC > 0 )
          locSumAbs += AbsLevel[ xC ][ yC - 1 ]
        locSumAbs = Clip3( 0, 31, locSumAbs )
- Otherwise (transform_skip_flag[ x0 ][ y0 ] is equal to 0),
    trafoSkip is set equal to 0 and the
    following applies:
      locSumAbs = 0
      if( xC < (1 << log2TbWidth) - 1 ) {
        locSumAbs += AbsLevel[ xC + 1 ][ yC ]
        if( xC < (1 << log2TbWidth) - 2 )
          locSumAbs += AbsLevel[ xC + 2 ][ yC ]
        if( yC < (1 << log2TbHeight) - 1 )
          locSumAbs += AbsLevel[ xC + 1 ][ yC + 1 ]
      }
      if( yC < (1 << log2TbHeight) - 1 ) {
        locSumAbs += AbsLevel[ xC ][ yC + 1 ]
        if( yC < (1 << log2TbHeight) - 2 )
          locSumAbs += AbsLevel [ xC ][ yC + 2 ]
      }
      locSumAbs = Clip3( 0, 31, locSumAbs - baseLevel * 5 )
```

In case that baseLevel is 0 in Table 10, the variables may be configured as Max (0, QState−1), and the rice parameter cRiceParam and the variable ZeroPos[n] may be derived as in the following Table 11 based on the variables locSumAbs, trafoSkip, and s. If the baseLevel is larger than 0, the rice parameter cRiceParam may be derived as in Table 11 based on the variables locSumAbs and trafoSkip.

TABLE 11

| trafoSkip | s | locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| 0 |   | cRiceParam | 0 | 0 | 0 | 0 | 0 | 0 | 0 | 1 | 1 | 1 | 1 | 1 | 1 | 1 | 2 | 2 |
| 1 |   | cRiceParam | 0 | 0 | 0 | 0 | 0 | 0 | 0 | 0 | 0 | 0 | 0 | 0 | 1 | 1 | 1 | 1 |
|   | 0 | ZeroPos[n] | 0 | 0 | 0 | 0 | 0 | 1 | 2 | 2 | 24 | 2 | 2 | 2 | 4 | 4 | 4 | 4 |
|   | 1 | ZeroPos[n] | 1 | 1 | 1 | 1 | 2 | 3 | 4 | 4 | 4 | 6 | 6 | 6 | 8 | 8 | 8 | 8 |
|   | 2 | ZeroPos[n] | 1 | 1 | 2 | 2 | 2 | 3 | 4 | 4 | 4 | 6 | 6 | 6 | 8 | 8 | 8 | 8 |
|   |   | locSumAbs | 16 | 17 | 18 | 19 | 20 | 21 | 22 | 23 | 24 | 25 | 26 | 27 | 28 | 29 | 30 | 31 |
| 0 |   | cRiceParam | 2 | 2 | 2 | 2 | 2 | 2 | 2 | 2 | 2 | 2 | 2 | 2 | 3 | 3 | 3 | 3 |
| 1 |   | cRiceParam | 1 | 1 | 1 | 1 | 1 | 1 | 1 | 1 | 1 | 2 | 2 | 2 | 2 | 2 | 2 | 2 |
|   | 0 | ZeroPos[n] | 4 | 4 | 4 | 4 | 4 | 4 | 4 | 8 | 8 | 8 | 8 | 8 | 16 | 16 | 16 | 16 |
|   | 1 | ZeroPos[n] | 4 | 4 | 12 | 12 | 12 | 12 | 12 | 12 | 12 | 16 | 16 | 16 | 16 | 16 | 16 | 16 |
|   | 2 | ZeroPos[n] | 8 | 8 | 12 | 12 | 12 | 12 | 12 | 12 | 16 | 16 | 16 | 16 | 16 | 16 | 16 | 16 |

Meanwhile, the binarization process for the syntax element dec_abs_level among the residual information may be performed as follows.

The input of the binarization process for the dec_abs_level may be a request for the binarization of the syntax element dec_abs_level[n], a color component cIdx, a luma position (x0, y0), a current coefficient scan position (xC, yC), a binary logarithm log2TbWidth of the width of the transform block, and a binary logarithm log2TbHeight of the height of the transform block. The luma position (x0, y0) may represent the top left sample of the current luma transform block based on the top left luma sample of the picture.

The output of the binarization process for the dec_abs_level may be binarization of the dec_abs_level (i.e., binarized bin string of the dec_abs_level). Through the binarization process, available bin strings for the dec_abs_level may be derived.

The rice parameter cRiceParam for the dec_abs_level[n] may be derived through the rice parameter deriving process that is performed through inputting of the color component cIdx and the luma position (x0, y0), the current coefficient scan position (xC, yC), the log2TbWidth that is the binary logarithm of the width of the transform block, and the log2TbHeight that is the binary logarithm of the height of the transform block. The rice parameter deriving process will be described in detail later.

Further, for example, the cMax for the dec_abs_level[n] may be derived based on the rice parameter cRiceParam. The cMax may be derived as in Equation 10.

Meanwhile, in case that the suffix bin string is present, the binarization for the dec_abs_level[n], that is, the bin string for the dec_abs_level[n], may be the concatenation of the prefix bin string and the suffix bin string. Further, in case that the suffix bin string is not present, the bin string for the dec_abs_level[n] may be the prefix bin string.

For example, the prefix bin string may be derived as follows.

The prefix value prefixVal of the dec_abs_level[n] may be derived as in the following equation.

$$\text{prefixVal} = \text{Min} (\text{cMax}, \text{dec\_abs\_level}[n]) \quad \text{[Equation 13]}$$

The prefix bin string of the dec_abs_level[n] may be derived through the TR binarization process for the prefixVal that uses the cMax and the cRiceParam as an input.

If the prefix bin string is equal to the bit string of which all bits are 1 and the bit length is 6, the suffix bin string of the dec_abs_level[n] may be present, and this may be derived as follows.

The suffix value suffixVal of the dec_abs_level[n] may be derived as in the following equation.

$$\text{suffixVal} = \text{dec\_abs\_level}[n] - \text{cMax} \quad \text{[Equation 14]}$$

The suffix bin string of the dec_abs_level[n] may be derived through the limited EGk binarization process for the binarization of the suffixVal of which the Exp-Golomb degree k is configured as cRiceParam+1.

The rice parameter for the dec_abs_level[n] may be derived by the pseudo code of Table 10.

Meanwhile, the regular residual coding (RRC) and the transform skip residual coding (TSRC) as described above may have the following difference.

For example, the rice parameter cRiceParam of the syntax element abs_remainder[ ] in the regular residual coding may be derived as described above, but the rice parameter cRiceParam of the syntax element abs_remainder[ ] in the transform skip residual coding may be derived as 1. That is, for example, in case that the transform skip is applied to the current block (e.g., current TB), the rice parameter cRiceParam for the abs_remainder[ ] of the transform skip residual coding for the current block may be derived as 1.

Further, referring to Table 1 to Table 4, although abs_level_gtx_flag[n][0] and/or abs_level_gtx_flag[n][1] may be signaled in the regular residual coding, abs_level_gtx_flag[n][0], abs_level_gtx_flag[n][1], abs_level_gtx_flag[n][2], abs_level_gtx_flag[n][3], and abs_level_gtx_flag[n][4] may be signaled in the transform skip residual coding. Here, the abs_level_gtx_flag[n][0] may be represented as abs_level_gt1_flag or the first coefficient level flag, the abs_level_gtx_flag[n][1] may be represented as abs_level_gt3_flag or the second coefficient level flag, the abs_level_gtx_flag[n][2] may be represented as abs_level_gt5_flag or the third coefficient level flag, the abs_level_gtx_flag[n][3] may be represented as abs_level_gt7_flag or the fourth coefficient level flag, and the abs_level_gtx_flag[n][4] may be represented as abs_level_gt9_flag or the fifth coefficient level flag. Specifically, the first coefficient level flag may be a flag representing whether the coefficient level is larger than the first threshold value (e.g., 1), the second coefficient level flag may be a flag representing whether the coefficient level is larger than the second threshold value (e.g., 3), the third coefficient level flag may be a flag representing whether the coefficient level is larger than the third threshold value (e.g., 5), the fourth coefficient level flag may be a flag representing whether the coefficient level is larger than the fourth threshold value (e.g., 7), and the fifth coefficient level flag may be a flag representing whether the coefficient level is larger than the fifth threshold value (e.g., 9).

As described above, in comparison to the regular residual coding, the transform skip residual coding may further include abs_level_gtx_flag[n][2], abs_level_gtx_flag[n][3], and abs_level_gtx_flag[n][4] in addition to abs_level_gtx_flag[n][0] and abs_level_gtx_flag[n][1].

Further, for example, in the regular residual coding, the syntax element coeff_sign_flag may be bypass-coded, whereas in the transform skip residual coding, the syntax element coeff_sign_flag may be bypass-coded or context-coded.

Figure 6:
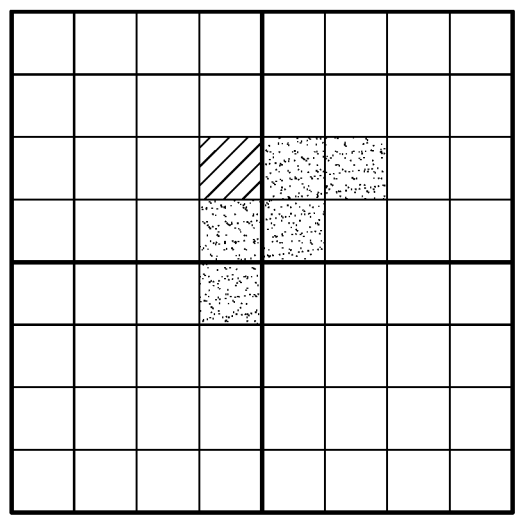
FIG. 6 illustrates an example of neighboring coefficients for deriving a rice parameter.
Figure 6:
Figure 6:

FIG. 6 illustrates an example of neighboring coefficients for deriving a rice parameter.

FIG. 6 shows five neighboring transform coefficients available for deriving a rice parameter for a target transform coefficient when regular residual coding is applied to a current block. The encoding apparatus and/or the decoding apparatus may derive a rice parameter using Table 11 based on locSumAbs derived by the pseudo code of Table 10. locSumAbs represents the sum of level values of the neighboring transform coefficients adjacent to the target transform coefficient.

To determine the availability of the neighboring coefficients, the encoding apparatus and/or the decoding apparatus may identify whether the neighboring coefficients are within the boundary of a transform block and/or are within an effective region after high-frequency zeroing. When a specific neighboring coefficient is out of the range of the current block or out of the effective region, the value thereof is not used to derive the rice parameter. In an example, referring to FIG. 6, a neighboring transform coefficient downward adjacent to the target transform coefficient is located within the boundary of the current block. Accordingly, the neighboring transform coefficient downward adjacent to the target transform coefficient may be used to derive the rice parameter. The remaining neighboring transform coefficients (neighboring transform coefficients adjacent on the right and bottom right of the target transform coefficient) are located outside the boundary of the current transform block and thus are not used to derive the rice parameter.

Figure 7:
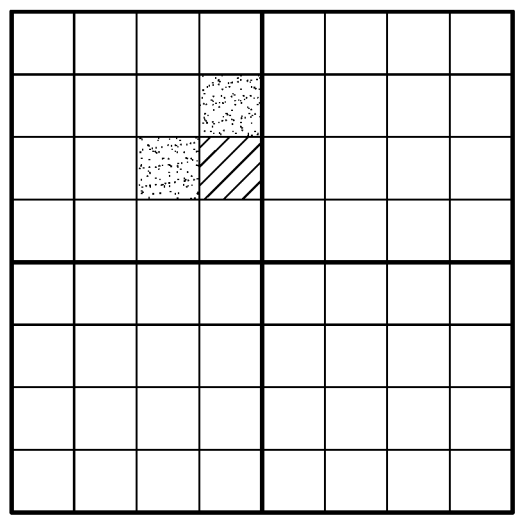
FIG. 7 illustrates another example of neighboring coefficients for deriving a rice parameter.
Figure 7:
Figure 7:

FIG. 7 illustrates another example of neighboring coefficients for deriving a rice parameter.

FIG. 7 shows two neighboring transform coefficients available for deriving a rice parameter for a target transform coefficient when transform skip residual coding is applied to a current block. To determine whether the neighboring coefficients are available when deriving the rice parameter, the encoding apparatus and/or the decoding apparatus may identify whether the neighboring coefficients are within the boundary of a transform block. When a specific neighboring coefficient is out of the range of the current block, the value thereof is not used to derive the rice parameter. In an example, referring to FIG. 7, both a neighboring transform coefficient leftward adjacent to the target transform coefficient and a neighboring transform coefficient upward adjacent to the target transform coefficient are located within the boundary of the current block and may thus be used to derive the rice parameter for the target transform coefficient. When the neighboring transform coefficient leftward adjacent to the target transform coefficient and the neighboring transform coefficient upward adjacent to the target transform coefficient are located outside the current transform block, the neighboring transform coefficients are not used to derive the rice parameter.

The following description is provided to describe specific examples of the present document. Since specific terms for devices or specific terms for signals/information illustrated below are provided for illustration, technical features of the present disclosure are not limited to the specific terms used in the following description. Hereinafter, a method for using a fixed binary codeword, that is, a fixed rice parameter, when binarizing a syntax (e.g., abs_remainder or dec_abs_level) representing the level value of a (transform) coefficient in residual coding is described. Here, a fixed rice parameter may mean that a rice parameter has a fixed value.

In residual coding, the level value of a transform coefficient may be classified into the following two types. First, when a maximum number of available context coded bins for a current transform coefficient are not exhausted or when the maximum number of available context coded bins is larger than or equal to a specific threshold value, various syntaxes (e.g., abs_level_gtx_flag and par_level_flag) are coded in advance before a syntax representing the level value of the transform coefficient is coded., and a residual level value (abs_remainder) obtained by subtracting a value meant by the syntaxes coded in advance from the absolute value of the actual coefficient is coded. Second, when a maximum number of available context coded bins are entirely exhausted or when the maximum number of available context coded bins is less than the specific threshold value, the absolute value of the coefficient is coded as the level value of the coefficient (dec_abs_level in regular residual coding and abs_remainder in transform skip residual coding). Therefore, according to this embodiment, the encoding apparatus and the decoding apparatus use a fixed rice parameter to code (encode or decode) the level value of the transform coefficient but may derive different rice parameters separately for the two types. Generally, in the first case, the size (or value) of abs_remainder may be small due to the syntaxes coded before coding abs_remainder. In the second case, since there is no syntax coded before abs_remainder, the size of abs_remainder and/or dec_abs_level is larger than that in the first case. Therefore, a rice parameter used in the second case may be set to a larger value than that of a rice parameter used in the first case.

For example, when a maximum number of available context coded bins for the current transform coefficient are not exhausted or when the maximum number of available context coded bins is larger than or equal to the threshold value, the encoding apparatus and the decoding apparatus may derive K as the rice parameter for the transform coefficient. However, when a maximum number of available context coded bins are entirely exhausted or when the maximum number of available context coded bins is less than the threshold value, L may be derived as the rice parameter for the transform coefficient. Here, the threshold value may be 4. Further, K may be 2, and L may be 3 or 4.

In an embodiment, the encoding apparatus and the decoding apparatus may derive the rice parameter for information indicating the level value of the current transform coefficient based on the following equation.

If MaxCcbs>=th, cRiceParam is set to K.

—Otherwise, cRiceParam is set to L.  [Equation 15]

Here, MAxCcbs denotes the maximum number of context coded bins available for the current transform coefficient, th denotes the threshold value, and cRiceParam denotes the rice parameter. K and L are arbitrary integer values.

In another embodiment, since the first case (when a maximum number of context coded bins available for the current transform coefficient are not exhausted or when the maximum number of available context coded bins is larger than or equal to the threshold value) occurs before the second case (when a maximum number of context coded bins available for the current transform coefficient are exhausted or when the maximum number of available context coded bins is less than the threshold value) in a coding order, when L and K have different values, L may be calculated or derived by adding or subtracting a specific offset (e.g., 1, 2, or 3) to or from K. Accordingly, the encoding apparatus and the decoding apparatus may also derive the rice parameter for the information indicating the level value of the current transform coefficient based on the following equation.

If Maxabs>=th, cRiceParam is set to K.

—Otherwise, cRiceParam is set to K+offset.  [Equation 16]

Here, the offset is an arbitrary integer value, which may be any one of a negative number and a positive number.

When deriving the rice parameter through the foregoing rice parameter derivation method, a method for determining a binarized codeword may be removed or omitted, thus enabling efficient residual coding.

The foregoing rice parameter derivation method may be applied to a case in which the current block is a transform skip block and may also be applied to a case in which the current block is a transform block. For example, when the foregoing rice parameter derivation method is applied to a transform skip block, the encoding apparatus and the decoding apparatus may derive the rice parameter based on Equation 15 or Equation 16 when the current block is a transform skip block, and may derive the rice parameter using Table 13 based on locSumAbs derived by the pseudo code of Table 12 when the current block is a transform block.

TABLE 12

```
locSumAbs = 0
if( xC < (1 << log2TbWidth) - 1 ) {
    locSumAbs += AbsLevel[ xC + 1 ][ yC ]
    if( xC < (1 << log2TbWidth) - 2 )
        locSumAbs += AbsLevel[ xC + 2 ][ yC ]
    if( yC < (1 << log2TbHeight) - 1 )
        locSumAbs += AbsLevel[ xC + 1 ][ yC + 1 ]
}
if( yC < (1 << log2TbHeight) - 1 ) {
    locSumAbs += AbsLevel[ xC ][ yC + 1 ]
    if( yC < (1 << log2TbHeight) - 2 )
        locSumAbs += AbsLevel [ xC ][ yC + 2 ]
}
locSumAbs = Clip3( 0, 31, locSumAbs - baseLevel * 5 )
```

TABLE 13

| trafoSkip | s | locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| 0 |   | cRiceParam | 0 | 0 | 0 | 0 | 0 | 0 | 0 | 1 | 1 | 1 | 1 | 1 | 1 | 1 | 2 | 2 |
|   | 0 | ZeroPos[n] | 0 | 0 | 0 | 0 | 0 | 1 | 2 | 2 | 2 | 2 | 2 | 2 | 4 | 4 | 4 | 4 |
|   | 1 | ZeroPos[n] | 1 | 1 | 1 | 1 | 2 | 3 | 4 | 4 | 4 | 6 | 6 | 6 | 8 | 8 | 8 | 8 |
|   | 2 | ZeroPos[n] | 1 | 1 | 2 | 2 | 2 | 3 | 4 | 4 | 4 | 6 | 6 | 6 | 8 | 8 | 8 | 8 |
|   |   | locSumAbs | 16 | 17 | 18 | 19 | 20 | 21 | 22 | 23 | 24 | 25 | 26 | 27 | 28 | 29 | 30 | 31 |
| 0 |   | cRiceParam | 2 | 2 | 2 | 2 | 2 | 2 | 2 | 2 | 2 | 2 | 2 | 3 | 3 | 3 | 3 | 3 |
|   | 0 | ZeroPos[n] | 4 | 4 | 4 | 4 | 4 | 4 | 8 | 8 | 8 | 8 | 8 | 16 | 16 | 16 | 16 | 16 |
|   | 1 | ZeroPos[n] | 4 | 4 | 12 | 12 | 12 | 12 | 12 | 12 | 12 | 12 | 16 | 16 | 16 | 16 | 16 | 16 |
|   | 2 | ZeroPos[n] | 8 | 8 | 12 | 12 | 12 | 12 | 12 | 12 | 12 | 16 | 16 | 16 | 16 | 16 | 16 | 16 |

In still another embodiment, when a maximum number of context coded bins available for the current transform coefficient are not exhausted or when the maximum number of available context coded bins is larger than or equal to the threshold value, the encoding apparatus and the decoding apparatus may fixedly derive K as the value of the rice parameter, and in other cases (when a maximum number of context coded bins available for the current transform coefficient are entirely exhausted or when the maximum number of available context coded bins is less than the threshold value), the encoding apparatus and the decoding apparatus may derive the rice parameter based on the level value of a neighboring transform coefficient of the current transform coefficient. When the rice parameter is derived based on the level value of the neighboring transform coefficient of the current transform coefficient, the encoding apparatus and the decoding apparatus derive the rice parameter using the table of Table 11 based on locSumAbs derived by the pseudo code of Table 10.

Figure 8:
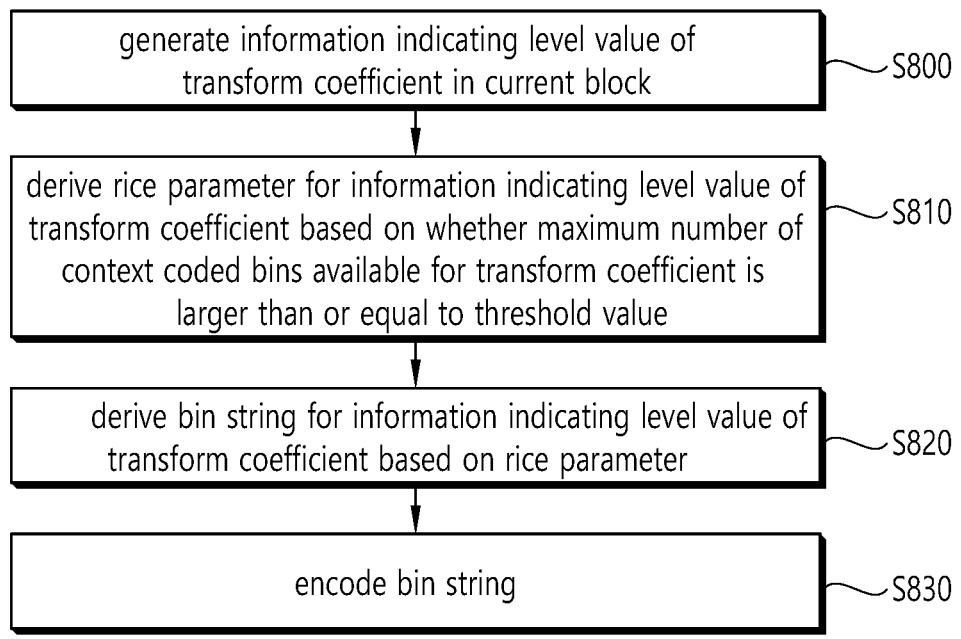
FIGS. 8 and 9 schematically illustrate an entropy encoding method and an example of related components according to an embodiment of the present document.
Figure 9:
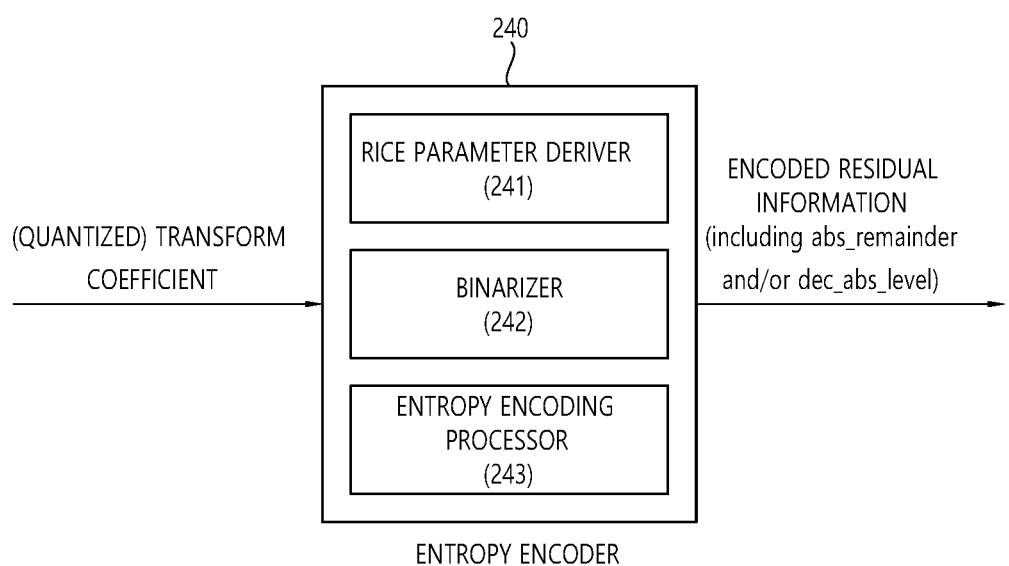

FIG. 8 and FIG. 9 schematically illustrate an example of an entropy encoding method and a relevant component according to an embodiment of the present document.

A rice parameter derivation method disclosed in FIG. 8 may be performed by the encoding apparatus 200 disclosed in FIG. 2 and FIG. 9. Specifically, for example, S800 and S810 of FIG. 8 may be performed by a rice parameter deriver 241 of the entropy encoder 240. S820 may be performed by a binarizer 242 of the entropy encoder 240, and S830 may be performed by the entropy encoding processor 243 of the entropy encoder 240.

The entropy encoding method disclosed in FIG. 8 may include the foregoing embodiments of the present document.

Referring to FIG. 8 and FIG. 9, the entropy encoder 240 performs a residual coding procedure on (quantized) transform coefficients. Here, the transform coefficients may be interchangeable with residual coefficients. The entropy encoder 240 may perform residual coding on (quantized) transform coefficients in a current block (current CB or current TB) according to a scan order. The entropy encoder 240 may generate and encode various syntax elements about residual information, for example, as illustrated in Table 1 to Table 4. For example, the rice parameter deriver 241 of the entropy encoder 240 may generate (or derive) information indicating the level value of a transform coefficient (quantized transform coefficient or current (quantized) residual coefficient) in the current block (S800). Here, the information indicating the level value of the transform coefficient may include abs_remainder[n], dec_abs_level[n], and the like. The value of abs_remainder[n] may be derived based on the values of abs_level_gtx_flag[n][0], par_level_flag[n], abs_level_gtx_flag[n][1], and the like. The value of dec_abs_level[n] may be derived as the level value of the transform coefficient.

The rice parameter deriver 241 of the entropy encoder 240 may derive a rice parameter for the information indicating the level value of the transform coefficient based on whether the maximum number of context coded bins available for the current transform coefficient is larger than or equal to a threshold value (S810). For example, when a maximum number of context coded bins available for the target transform coefficient within the corresponding block (CU or TU) are not entirely exhausted according to the scan order (when a context coded bin available for the transform coefficient remains) or when the maximum number of available context coded bins is larger than or equal to the threshold value, the encoding apparatus may derive a first rice parameter for the information indicating the level value of the transform coefficient. When a maximum number of available context coded bins are entirely exhausted or when the maximum number of available context coded bins is less than the threshold value, the encoding apparatus may derive a second rice parameter for the information indicating the level value of the transform coefficient. Here, the threshold value may be set to 4. The first rice parameter and the second rice parameter may have a fixed value. Here, the value of the first rice parameter may be smaller than the value of the second rice parameter. For example, the value of the first rice parameter may be 2, and the value of the second rice parameter may be 3 or 4.

In an embodiment, the rice parameter deriver 241 of the entropy encoder 240 may derive the rice parameter for the information indicating the level value of the current transform coefficient as the first rice parameter and/or the second rice parameter based on Equation 15 or Equation 16 illustrated above according to whether a maximum number of context coded bins available for the current transform coefficient are exhausted or whether the maximum number of available context coded bins is larger than or equal to the threshold value. In another embodiment, the rice parameter deriver 241 of the entropy encoder 240 may fixedly derive the first rice parameter as the rice parameter for the transform coefficient when a maximum number of context coded bins available for the current transform coefficient are not exhausted or when the maximum number of available context coded bins is larger than or equal to the threshold value, and may the rice parameter for the transform coefficient based on a neighboring transform coefficient of the current transform coefficient in other cases. For example, when a maximum number of context coded bins available for the current transform coefficient are exhausted or when the maximum number of available context coded bins is less than the threshold value, the rice parameter deriver 241 of the entropy encoder 240 may derive the rice parameter based on the sum (locSumAbs) of level values of neighboring transform coefficients of the current transform coefficient. Here, the neighboring transform coefficients of the current transform coefficient may include the neighboring transform coefficients shown in FIG. 6 when the current transform coefficient is included in a transform block, and may include the neighboring transform coefficients shown in FIG. 7 (transform coefficients upward and/or leftward adjacent to the target transform coefficient) when the current transform coefficient is included in a transform skip block.

It is apparent to those skilled in the art that the foregoing procedure for deriving the rice parameter may be omitted for sig_coeff_flag, par_level_flag, abs_level_gtx_flag, and the like that are binarized in a fixed length without using a rice parameter. For sig_coeff_flag, par_level_flag, abs_level_gtx_flag, and the like, a binarization method other than rice parameter-based binarization may be performed.

The binarizer 242 of the entropy encoder 240 may derive a bin string for the information (abs_remainder[n] or dec_abs_level[n]) indicating the level value of the transform coefficient by performing binarization based on the derived rice parameter (S820). The length of the bin string may be adaptively determined by the derived rice parameter.

The entropy encoding processor 243 of the entropy encoder 240 may perform (entropy) encoding based on the bin string for the information (abs_remainder[n] or dec_abs_level[n]) indicating the level value of the transform coefficient (S830). The entropy encoding processor 243 of the entropy encoder 240 may perform context-based entropy encoding of the bin string based on a context-adaptive arithmetic coding (CABAC) entropy coding scheme, and resultant output may be included in a bitstream. In this case, the encoding apparatus may perform the entropy coding by deriving context information for each bin of the bin string, and may update the context information for each bin. As described above, the bitstream may include various pieces of information for image/video decoding, such as prediction information, in addition to residual information including the information on abs_remainder[n] or dec_abs_level[n]. The bitstream may further include selection information for the rice parameter table. The bitstream may be transmitted to a decoding apparatus through a (digital) storage medium or a network.

Figure 10:
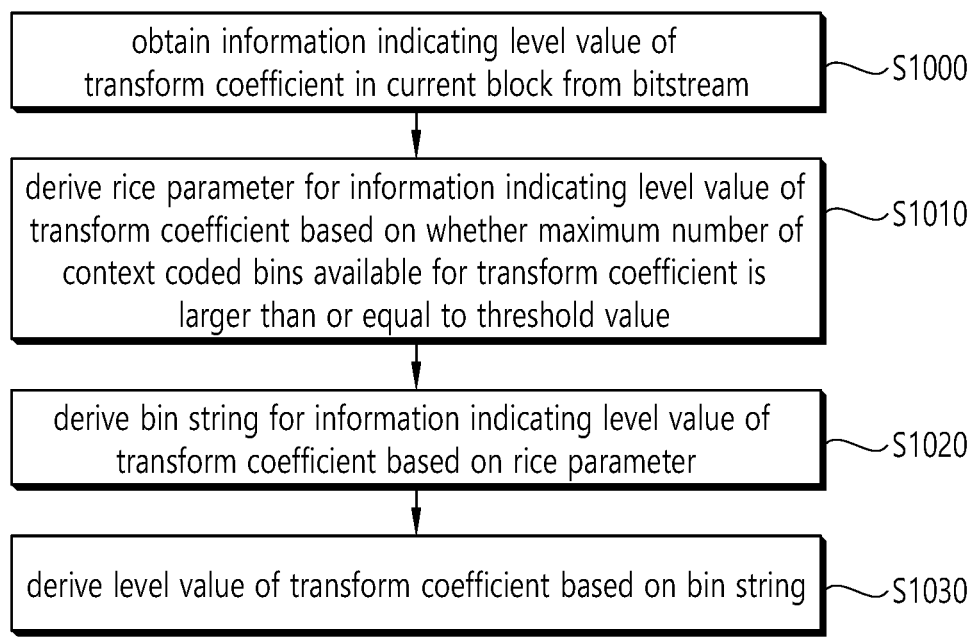
FIGS. 10 and 11 schematically illustrate an entropy decoding method and an example of related components according to an embodiment of the present document.
Figure 11:
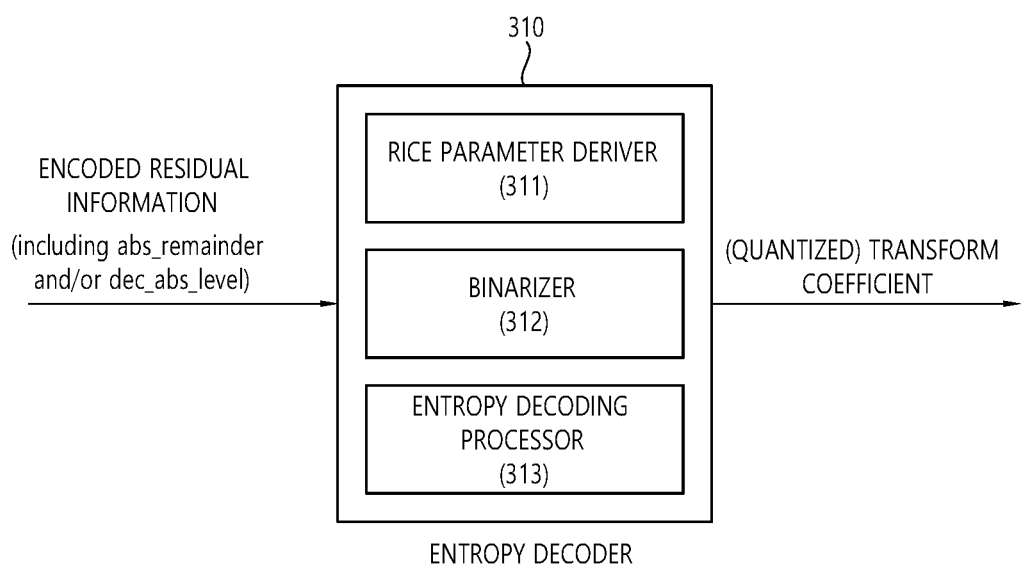

FIG. 10 and FIG. 11 schematically illustrate an example of an entropy decoding method and a relevant component according to an embodiment of the present document.

A rice parameter derivation method disclosed in FIG. 10 may be performed by the decoding apparatus 300 disclosed in FIG. 3 and FIG. 11. Specifically, for example, S1000 and S1010 of FIG. 10 may be performed by a rice parameter deriver 311 of the entropy decoder 310. S1020 may be performed by a binarizer 212 of the entropy decoder 310, and S1030 may be performed by the entropy decoding processor 313 of the entropy decoder 310. The entropy decoding method disclosed in FIG. 10 may include the foregoing embodiments of the present document.

Referring to FIG. 10 and FIG. 11, the entropy encoder 240 may derive (quantized) transform coefficients by decoding encoded residual information. Here, transform coefficients may be interchangeable with residual coefficients. The decoding apparatus may derive (quantized) transform coefficients by decoding encoded residual information about a current block (current CB or current TB). The decoding apparatus may decode various syntax elements about residual information, for example, as illustrated in Table 1 to Table 4, may interpret the values of the syntax elements, and may derive the (quantized) transform coefficients based on the syntax elements.

Specifically, the rice parameter deriver 311 of the entropy decoder 310 may obtain information (abs_remainder[n]), dec_abs_level[n], levminus1, and the like) indicating the level value of a current transform coefficient (quantized transform coefficient or current (quantized) residual coefficient) from a bitstream (S1000). The rice parameter deriver 311 of the entropy decoder 310 may derive a rice parameter for the information indicating the level value of the current transform coefficient based on whether the maximum number of context coded bins available for the current transform coefficient is larger than or equal to a threshold value (e.g., 4) (S1010).

For example, when a maximum number of context coded bins available for the target transform coefficient within the corresponding block (CU or TU) are not entirely exhausted according to the scan order (when a context coded bin available for the transform coefficient remains) or when the maximum number of available context coded bins is larger than or equal to the threshold value, the decoding apparatus may derive a first rice parameter for the information indicating the level value of the transform coefficient. When a maximum number of available context coded bins are entirely exhausted or when the maximum number of available context coded bins is less than the threshold value, the decoding apparatus may derive a second rice parameter for the information indicating the level value of the transform coefficient. Here, the first rice parameter and the second rice parameter may have a fixed value. The value of the first rice parameter may be smaller than the value of the second rice parameter. For example, the value of the first rice parameter may be 2, and the value of the second rice parameter may be 3 or 4.

In an embodiment, the rice parameter deriver 311 of the entropy decoder 310 may derive the rice parameter for the information indicating the level value of the current transform coefficient as the first rice parameter and/or the second rice parameter based on Equation 15 or Equation 16 illustrated above according to whether a maximum number of context coded bins available for the current transform coefficient are exhausted or whether the maximum number of available context coded bins is larger than or equal to the threshold value.

In another embodiment, the rice parameter deriver 311 of the entropy decoder 310 may fixedly derive the first rice parameter as the rice parameter for the transform coefficient when a maximum number of context coded bins available for the current transform coefficient are not exhausted or when the maximum number of available context coded bins is larger than or equal to the threshold value, and may derive the rice parameter for the transform coefficient based on a neighboring transform coefficient of the current transform coefficient in other cases. For example, when a maximum number of context coded bins available for the current transform coefficient are exhausted or when the maximum number of available context coded bins is less than the threshold value, the rice parameter deriver 311 of the entropy decoder 310 may derive the rice parameter based on the sum (locSumAbs) of level values of neighboring transform coefficients of the current transform coefficient. Here, the neighboring transform coefficients of the current transform coefficient may include the neighboring transform coefficients shown in FIG. 6 when the current transform coefficient is included in a transform block, and may include the neighboring transform coefficients shown in FIG. 7 (transform coefficients upward and/or leftward adjacent to the target transform coefficient) when the current transform coefficient is included in a transform skip block.

It is apparent to those skilled in the art that the foregoing procedure for deriving the rice parameter may be omitted for sig_coeff_flag, par_level_flag, abs_level_gtx_flag, and the like that are binarized in a fixed length without using a rice parameter. For sig_coeff_flag, par_level_flag, abs_level_gtx_flag, and the like, a binarization method other than rice parameter-based binarization may be performed.

The binarizer 312 of the entropy decoder 310 may derive a bin string for the information (abs_remainder[n] or dec_abs_level[n]) indicating the level value of the transform coefficient by performing binarization based on the rice parameter derived by the rice parameter deriver 311 of the entropy decoder 310 (S1020). For example, the binarizer 312 of the entropy decoder 310 may derive available bin strings for available values of abs_remainder[n] or dec_abs_level[n] through the binarization. The length of the available bin string may be adaptively determined by the derived rice parameter.

The entropy decoding processor 313 of the entropy decoder 310 may derive the level value of the transform coefficient by performing entropy decoding based on the bin string for the information (abs_remainder[n] or dec_abs_level[n]) indicating the level value of the transform coefficient (S1030). For example, the entropy decoding processor 313 of the entropy decoder 310 may compare the derived bin string with the available bin strings by sequentially parsing and decoding each bin/bit for abs_remainder[n] or dec_abs_level[n]. When the derived bin string is the same as one of the available bin strings, a value corresponding to the bin string may be derived as the value of abs_remainder[n]. Otherwise, a next bit in the bitstream may be further parsed and decoded, and then the foregoing comparison procedure may be performed. Through this process, specific information (specific syntax element) in the bitstream may be signaled using a variable-length bit without using a starting bit or an ending bit for the information. Accordingly, relatively fewer bits may be allocated for a lower value, and overall coding efficiency may be increased.

The decoding apparatus may perform context-based entropy decoding of each bin in the bin string from the bitstream based on a CABAC entropy coding scheme. In this case, the decoding apparatus may perform the entropy coding by deriving context information for each bin of the bin string, and may update the context information for each bin. This entropy decoding procedure may be performed by the entropy decoding processor 313 in the entropy decoder 310. As described above, the bitstream may include various pieces of information for image/video decoding, such as prediction information, in addition to residual information including the information on abs_remainder[n] or dec_abs_level[n]. The bitstream may further include selection information for a rice parameter lookup table. As described above, the bitstream may be transmitted to a decoding apparatus through a (digital) storage medium or a network.

The decoding apparatus may derive (quantized) transform/residual coefficients based on the entropy decoding, and may derive residual samples for the current block by performing dequantization and/or inverse transform procedures based on the (quantized) transform/residual coefficients if necessary. Reconstructed samples may be generated based on the residual samples and prediction samples derived through inter prediction and/or intra prediction, and a reconstructed block/picture including the reconstructed samples may be generated.

Figure 12:
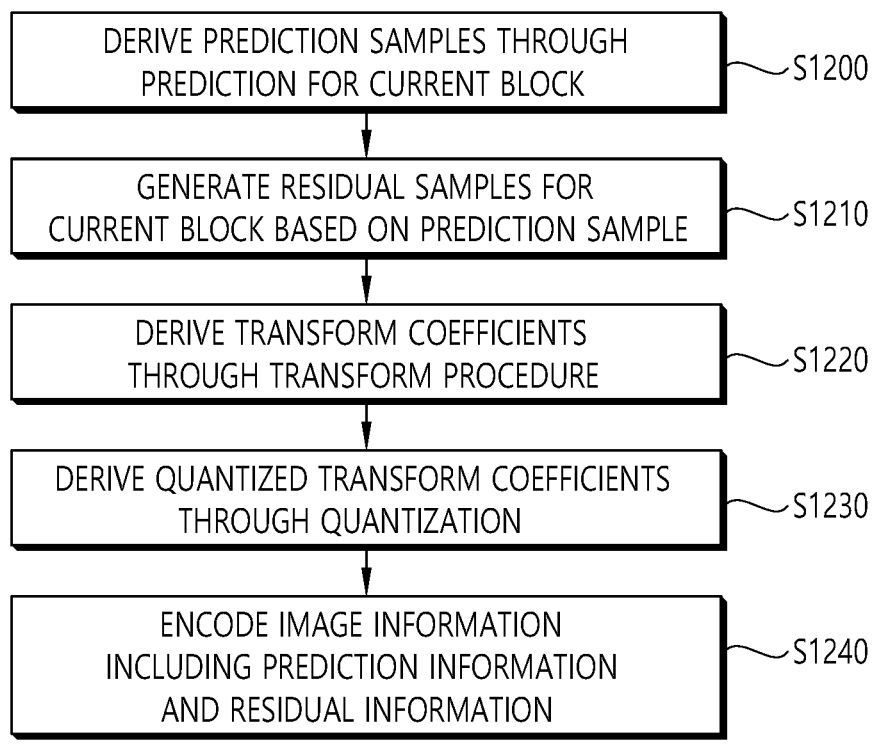
FIG. 12 illustrates a video/image encoding method according to an embodiment of the present document.

FIG. 12 illustrates a video/image encoding method according to an embodiment of the present document.

The video/image encoding method disclosed in FIG. 12 may be performed by the encoding apparatus 200 disclosed in FIG. 2. Specifically, for example, S1200 of FIG. 12 may be performed by the predictor 220 of the encoding apparatus, and S1210 may be performed by the subtractor 231 of the encoding apparatus. S1220 may be performed by the transformer 232 of the encoding apparatus, S1230 may be performed by the quantizer 233 of the encoding apparatus, and S1240 may be performed by the entropy encoder 240 of the encoding apparatus. S800 to S830 as described above with reference to FIG. 8 may be included in the procedure of S1240.

Referring to FIG. 12, the encoding apparatus may derive prediction samples through prediction for the current block (S1200). The encoding apparatus may determine whether to perform inter prediction or intra prediction with respect to the current block, and may determine a specific inter prediction mode or a specific intra prediction mode based on an RD cost. In accordance with the determined mode, the encoding apparatus may derive the prediction samples for the current block.

The encoding apparatus may derive residual samples through comparison of the original samples for the current block with the prediction samples (S1210).

The encoding apparatus may derive transform coefficients through a transform procedure for the residual samples (S1220), and may derive quantized transform coefficients through quantization of the derived transform coefficients (S1230).

The encoding apparatus may encode image information including prediction information and residual information, and may output the encoded image information in the form of a bitstream (S1240). The prediction information may include information (e.g., in case that the inter prediction is applied) on prediction mode information and motion information as information related to the prediction procedure. The residual information is information about the quantized transform coefficients, and for example, may include the information disclosed in Table 1 to Table 4 described above.

The output bitstream may be transferred to the decoding apparatus through a storage medium or a network.

Figure 13:
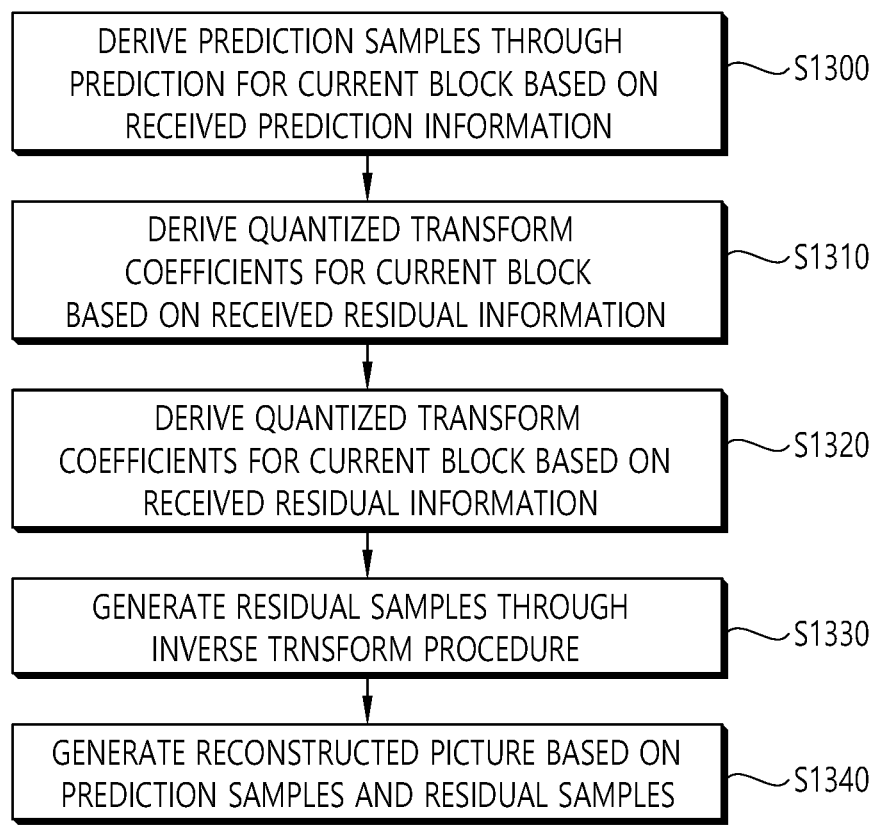
FIG. 13 illustrates a video/image decoding method according to an embodiment of the present document.

FIG. 13 illustrates a video/image decoding method according to an embodiment of the present document.

The video/image decoding method disclosed in FIG. 13 may be performed by the decoding apparatus 300 disclosed in FIG. 3. Specifically, for example, S1300 of FIG. 13 may be performed by the predictor 330 of the decoding apparatus. A procedure of deriving values of related syntax elements through decoding of prediction information included in a bitstream in S1300 may be performed by the entropy decoder 310 of the decoding apparatus. S1310, S1320, S1330, and S1340 may be performed by the entropy decoder 310, the dequantizer 321, the inverse transformer 322, and the adder 340 of the decoding apparatus, respectively. S1000 to S1030 as described above in FIG. 10 may be included in the procedure of S1310.

The decoding apparatus may perform an operation corresponding to the operation performed by the encoding apparatus. The decoding apparatus may perform inter prediction or intra prediction for the current block based on received prediction information, and may derive prediction samples (S1300).

The decoding apparatus may derive quantized transform coefficients for the current block based on received residual information (S1310).

The decoding apparatus may derive transform coefficients through dequantization of the quantized transform coefficients (S1320).

The decoding apparatus may derive residual samples through an inverse transform procedure for the transform coefficients (S1330).

The decoding apparatus may generate reconstructed samples for the current block based on the prediction samples and the residual samples, and may generate a reconstructed picture based on this (S1340). Thereafter, as described above, an in-loop filtering procedure may be further applied to the reconstructed picture.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present document may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Blu-ray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 14:
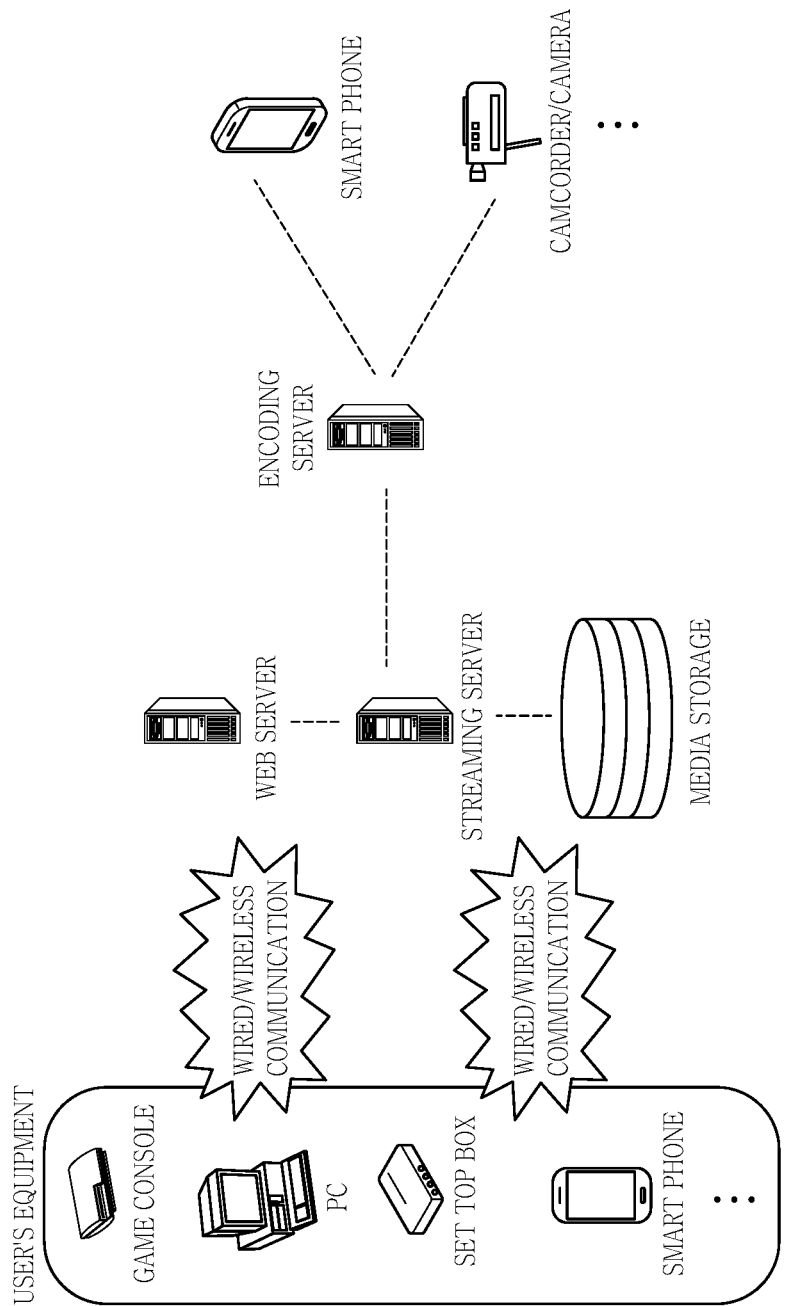
FIG. 14 illustrates an example of a content streaming system to which embodiments disclosed in the present document are applicable.

FIG. 14 represents an example of a contents streaming system to which the embodiment of the present document may be applied.

Referring to FIG. 14, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case in which the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. A video decoding method performed by a decoding apparatus, the method comprising:
    obtaining information indicating a level value of a transform coefficient in a current block from a bitstream;
    deriving a rice parameter for the information indicating the level value of the transform coefficient based on whether a maximum number of context coded bins available for the transform coefficient is larger than or equal to a threshold value;
    deriving a bin string for the information indicating the level value of the transform coefficient based on the rice parameter; and
    deriving the level value of the transform coefficient based on the bin string,
    wherein the deriving of the rice parameter comprises deriving a first rice parameter based on the maximum number of available context coded bins being larger than or equal to the threshold value and deriving a second rice parameter based on the maximum number of available context coded bins being less than the threshold value,
    wherein a value of the first rice parameter is smaller than a value of the second rice parameter, and
    wherein the second rice parameter is derived based on the first rice parameter and a preset offset.

2. The video decoding method of claim 1, wherein the deriving of the rice parameter is performed based on the current block being a transform skip block.

3. The video decoding method of claim 1, wherein the information indicating the level value of the transform coefficient comprises an abs_remainder syntax element.

4. The video decoding method of claim 1, wherein the threshold value is 4.

5. The video decoding method of claim 1, wherein the first rice parameter and the second rice parameter have a predetermined value.

6. The video decoding method of claim 1, wherein the value of first rice parameter is 2, and the value of the second rice parameter is 3 or 4.

7. The video decoding method of claim 1, wherein the second rice parameter is derived based on a neighboring transform coefficient of the transform coefficient.

8. The video decoding method of claim 7, wherein the neighboring transform coefficient is a transform coefficient upward or leftward adjacent to the transform coefficient.

9. The video decoding method of claim 7, wherein the second rice parameter is derived based on a sum of level values of neighboring transform coefficients of the transform coefficient.

10. A video encoding method performed by an encoding apparatus, the method comprising:

generating information indicating a level value of a transform coefficient in a current block;

deriving a rice parameter for the information indicating the level value of the transform coefficient based on whether a maximum number of context coded bins available for the transform coefficient is larger than or equal to a threshold value;

deriving a bin string for the information indicating the level value of the transform coefficient based on the rice parameter; and encoding the bin string, wherein the deriving of the rice parameter comprises deriving a first rice parameter based on the maximum number of available context coded bins being larger than or equal to the threshold value and deriving a second rice parameter based on the maximum number of available context coded bins being less than the threshold value, wherein a value of the first rice parameter is smaller than a value of the second rice parameter, and wherein the second rice parameter is derived based on the first rice parameter and a preset offset.

11. The video encoding method of claim 10, wherein the deriving of the rice parameter is performed based on the current block being a transform skip block.

12. A method of transmitting a bitstream generated by a video encoding method, the video encoding method comprising:

generating information indicating a level value of a transform coefficient in a current block;

deriving a rice parameter for the information indicating the level value of the transform coefficient based on whether a maximum number of context coded bins available for the transform coefficient is larger than or equal to a threshold value;

deriving a bin string for the information indicating the level value of the transform coefficient based on the rice parameter; and encoding the bin string, wherein the deriving of the rice parameter comprises deriving a first rice parameter based on the maximum number of available context coded bins being larger than or equal to the threshold value and deriving a second rice parameter based on the maximum number of available context coded bins being less than the threshold value, wherein a value of the first rice parameter is smaller than a value of the second rice parameter, and wherein the second rice parameter is derived based on the first rice parameter and a preset offset.

* * * * *